United States Patent
Yahagi

(10) Patent No.: US 7,623,499 B2
(45) Date of Patent: Nov. 24, 2009

(54) MOBILE TERMINAL MANAGEMENT SYSTEM, MOBILE TERMINAL, AGENT, AND PROGRAM

(75) Inventor: Masahiko Yahagi, Tokyo (JP)

(73) Assignee: NEC Corporation, Tokyo (JP)

( * ) Notice: Subject to any disclaimer, the term of this patent is extended or adjusted under 35 U.S.C. 154(b) by 900 days.

(21) Appl. No.: 10/471,649

(22) PCT Filed: Mar. 12, 2002

(86) PCT No.: PCT/JP02/02300

§ 371 (c)(1),
(2), (4) Date: Sep. 12, 2003

(87) PCT Pub. No.: WO02/073906

PCT Pub. Date: Sep. 19, 2002

(65) Prior Publication Data

US 2004/0151148 A1 Aug. 5, 2004

(30) Foreign Application Priority Data

Mar. 14, 2001 (JP) ............................. 2001/071882
Mar. 14, 2001 (JP) ............................. 2001/071883

(51) Int. Cl.
*H04W 4/00* (2009.01)
(52) U.S. Cl. .................... 370/338; 370/328; 370/331; 370/310.2; 445/435.1
(58) Field of Classification Search ......... 455/436–438, 455/442, 432.1, 435.1; 370/328–338; 709/202–203
See application file for complete search history.

(56) References Cited

U.S. PATENT DOCUMENTS 5,825,759 A * 10/1998 Liu .............................. 370/331

(Continued)

FOREIGN PATENT DOCUMENTS

EP 0 794 636 A2 9/1997

(Continued)

OTHER PUBLICATIONS

Eva Gustafsson et al., "Mobile IP Regional Registration Draft-IETF-MobileIP-Reg-Tunnel-03.TXT", http://www.ietf.org/org/ietd/lid-abstracts.txt, Jan. 13, 2000.

(Continued)

*Primary Examiner*—Sharad Rampuria
(74) *Attorney, Agent, or Firm*—Sughrue Mion, PLLC

(57) ABSTRACT

In a mobile communication network, the foreign agent function of a mobile terminal that makes a small number of moves is placed in a radio base station, and the foreign agent function of a mobile terminal that makes a large number of moves is placed in a first node setting and managing a radio access link with a mobile terminal connected through a radio base station, thereby preventing concentration of foreign agent functions on the first node. When a mobile terminal (MN) detects a move to a foreign link to be connected, it acquires a new c/o address and transmits a binding update request to which a communication party list is attached to a home agent. The home agent transmits a binding update request to report a pair of the new c/o address and the home address of the mobile terminal to the communication parties in the communication party list.

32 Claims, 18 Drawing Sheets

U.S. PATENT DOCUMENTS

| | | | | |
|---|---|---|---|---|
| 6,122,268 | A * | 9/2000 | Okanoue et al. | 370/338 |
| 6,167,513 | A * | 12/2000 | Inoue et al. | 713/150 |
| 6,366,561 | B1 * | 4/2002 | Bender | 370/238 |
| 6,424,638 | B1 * | 7/2002 | Ray et al. | 370/331 |
| 6,434,134 | B1 * | 8/2002 | La Porta et al. | 370/338 |
| 6,515,974 | B1 * | 2/2003 | Inoue et al. | 370/331 |
| 6,567,664 | B1 * | 5/2003 | Bergenwall et al. | 455/435.1 |
| 6,654,359 | B1 * | 11/2003 | La Porta et al. | 370/328 |
| 6,738,362 | B1 * | 5/2004 | Xu et al. | 370/329 |
| 6,771,623 | B2 * | 8/2004 | Ton | 370/331 |
| 6,842,462 | B1 * | 1/2005 | Ramjee et al. | 370/466 |
| 6,859,448 | B1 * | 2/2005 | Roy | 370/338 |
| 6,947,401 | B2 * | 9/2005 | El-Malki et al. | 370/331 |
| 6,954,442 | B2 * | 10/2005 | Tsirtsis et al. | 370/328 |
| 6,970,445 | B2 * | 11/2005 | O'Neill et al. | 370/338 |
| 6,980,802 | B2 * | 12/2005 | Jung | 455/436 |
| 6,992,995 | B2 * | 1/2006 | Agrawal et al. | 370/328 |
| 7,031,275 | B1 * | 4/2006 | Borella et al. | 370/328 |
| 7,079,511 | B2 * | 7/2006 | Abrol et al. | 370/331 |
| 7,130,629 | B1 * | 10/2006 | Leung et al. | 455/435.1 |
| 7,193,985 | B1 * | 3/2007 | Lewis et al. | 370/338 |
| 7,292,558 | B2 * | 11/2007 | Adrangi et al. | 370/338 |
| 7,453,852 | B2 * | 11/2008 | Buddhikot et al. | 370/331 |
| 7,477,629 | B2 * | 1/2009 | Tsirtsis et al. | 370/338 |
| 7,483,697 | B2 * | 1/2009 | Ohki | 455/432.1 |
| 7,486,670 | B2 * | 2/2009 | Kinoshita et al. | 370/389 |
| 2001/0044305 | A1 * | 11/2001 | Reddy et al. | 455/436 |
| 2002/0068570 | A1 * | 6/2002 | Abrol et al. | 455/438 |

FOREIGN PATENT DOCUMENTS

| | | |
|---|---|---|
| EP | 1 011 243 A1 | 6/2000 |
| EP | 1 030 491 A2 | 8/2000 |
| JP | 4-111700 A | 4/1992 |
| JP | 5-56472 A | 3/1993 |
| JP | 5-145472 A | 6/1993 |
| JP | 07-170286 A | 7/1995 |
| JP | 11-252182 A | 9/1999 |
| JP | 2000-224233 A | 8/2000 |
| JP | 2000-332825 A | 11/2000 |
| WO | WO 01/05171 A1 | 1/2001 |

OTHER PUBLICATIONS

Eva Gustafsson et al, "Mobile IP Regional Registration Draft-IETF-MobileIP-Reg-Tunnel-03.TXT", Draft IETF, Jan. 13, 2000, pp. 1-29.

H. Onishi et al., "Mobile IP ami ni okeru ketro saitekika houhou no teian", (Proposal for a route optimization method for Mobile IP networks), Denshi Joho Tsushin Galckai Gijutsu Kenkyu Hokoku vol. 99, No. 507, SSE99-I23, Institute of Electronics, Information and Communication Engineers, Dec. 17, 1999, pp. 7-12.

* cited by examiner

F I G. 10
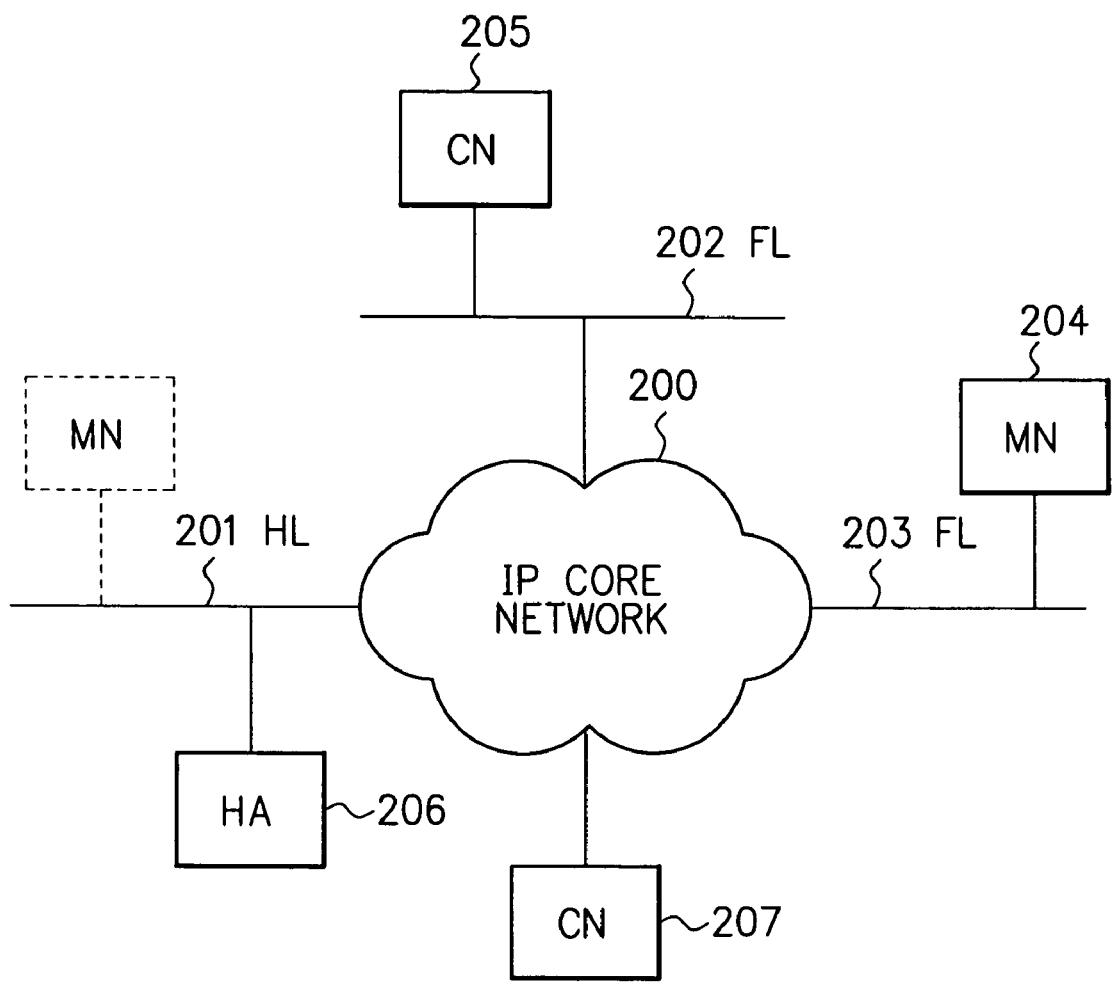

FIG. 11

| HOME ADDRESS OF CN1 |
| HOME ADDRESS OF CN2 |
| ⋮ |
| HOME ADDRESS OF CNm |

F I G. 14
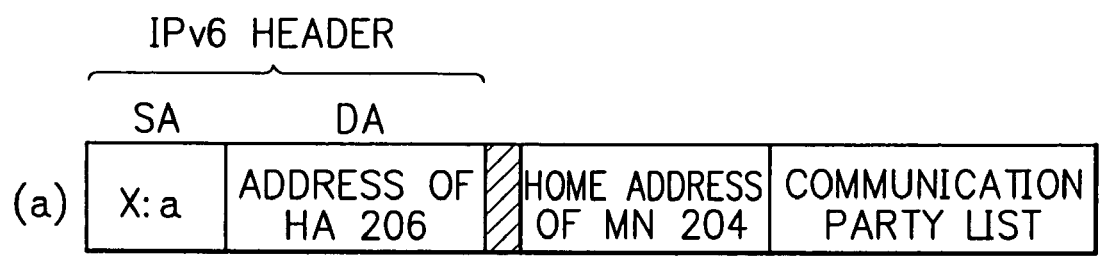
(a)
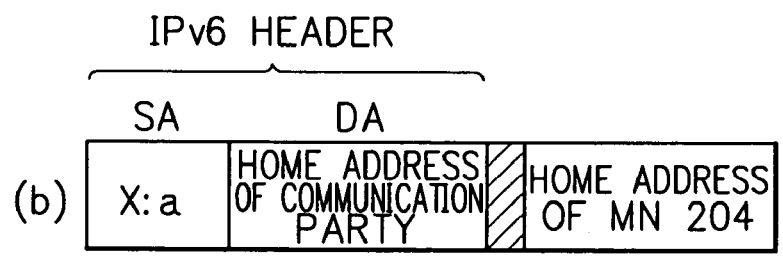
(b)

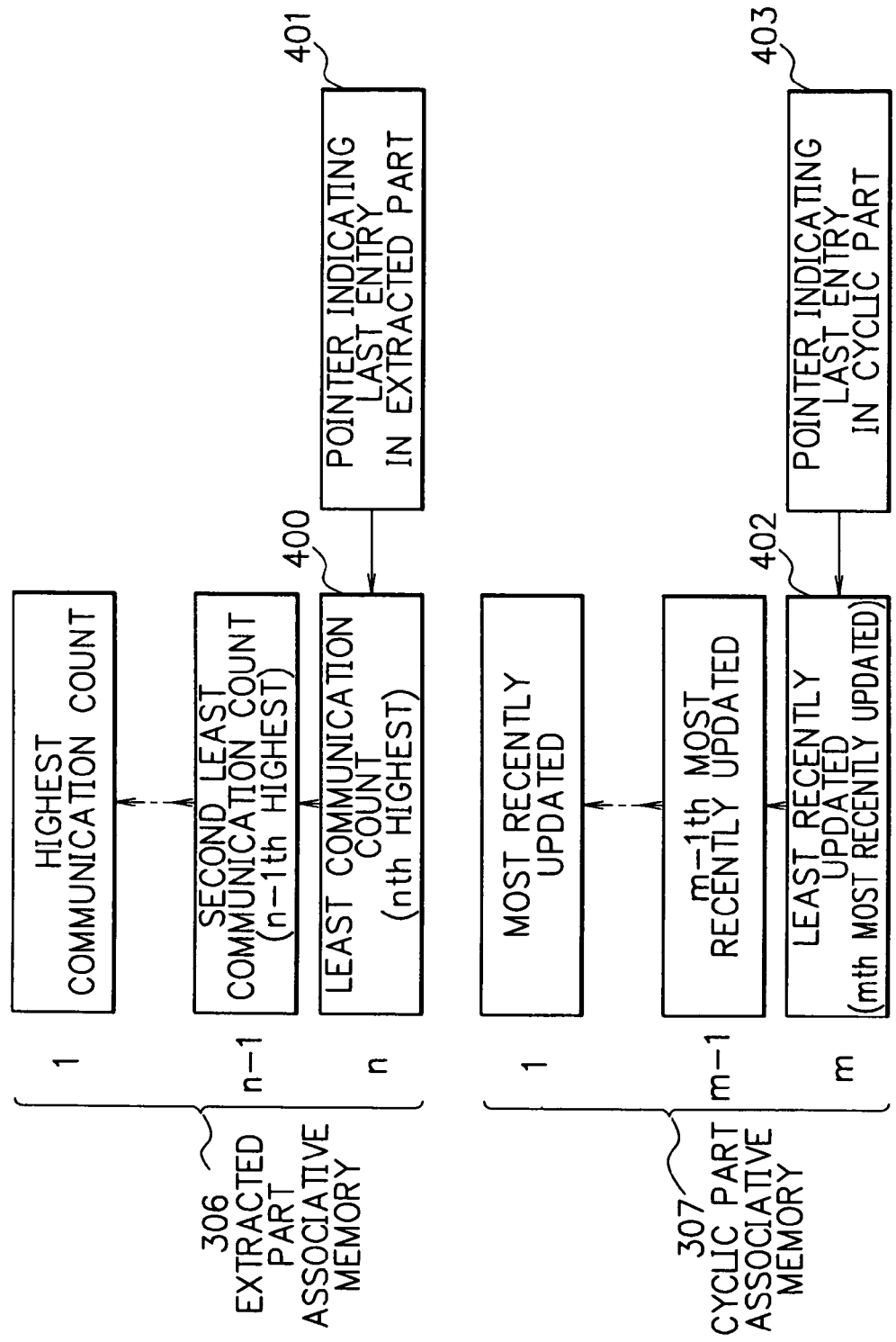

MOBILE TERMINAL MANAGEMENT SYSTEM, MOBILE TERMINAL, AGENT, AND PROGRAM

TECHNICAL FIELD

The present invention relates to a network (especially, to a packet network) that handles mobile terminals such as personal digital assistance and cellular telephones, and more specifically, relates to a mobile terminal management system in which a communication party is notified of the c/o address of a mobile terminal beforehand so that the movement of the mobile terminal can be managed and packets can be directly transmitted to the mobile terminal.

BACKGROUND ART

Mobile IP is aimed at enabling a mobile terminal to communicate with a communication party without any change in its IP address when moving from a subnetwork to which the mobile terminal has been linked to another one. In the Mobile IP, a node that continually moves and changes the connected subnetwork is called "mobile terminal" (Mobile Node; abbreviated to MN), the subnetwork to which the mobile terminal was originally linked is called "home link" (Home Link; abbreviated to HL), a node that is present in the home link and takes charge during the absence of the mobile terminal is called "home agent" (Home Agent; abbreviated to HA), a subnetwork to which the mobile terminal is actually linked is called "foreign link" (Foreign Link; abbreviated to FL), a node that is present in the foreign link to look after the mobile terminal while the mobile terminal is in the foreign link is called "foreign agent" (Foreign Agent; abbreviated to FA), an address that is assigned for the mobile terminal in the foreign link is called "c/o address" (Care-Of Address; abbreviated to COA), and an address that is uniquely assigned for the mobile terminal independently of the connected subnetwork is called "home address". Incidentally, the communication party (Correspondence Node; abbreviated to CN) of the mobile terminal includes fixed terminals as well as mobile terminals.

In a network based on the Mobile IP, IPv4 and IPv6, following processes are generally performed.

Set out below are processes according to the Mobile IP.

(1) In the case where the mobile terminal is in the home link

As with the case of ordinary TCP/IP, the mobile terminal communicates with a communication party in the ordinary way.

(2) In the case where the mobile terminal is not in the home link

The mobile terminal detects that it is somewhere other than the home link, and executes "Home Registration", that is, notifies the home agent of a new c/o address through the foreign agent so that all packets to its home address are forwarded to the mobile terminal.

(2-1) The arrival of packets

The packets sent to the home address from the communication party arrive at the home link through the mechanism of normal IP routing. The home agent catches the packets by Proxy ARP or the like, and forwards the packets to the foreign agent in the network where the mobile terminal is present by tunneling. Thus, the mobile terminal receives the packets.

(2-2) The transmission of packets

When the mobile terminal transmits packets to the communication party, the header of each IP packet still contains the home address as a source address. In the case where any error occurs on the way, the packets are sent to the home address and, consequently, returns to the mobile terminal through the above-mentioned mechanism.

Incidentally, there has been promoted the standardization of the mobile communication system "IMT2000" for the mobile communication service providing more high-speed broadband access, and one of the main services is an offer of IP packet communications. The application of the Mobile IP is under review as a method for the location management of mobile terminals on the IMT2000 network.

FIG. 9 is a diagram showing the configuration of an IP packet network envisioned for the IMT2000 network. In FIG. 9, mobile terminals 1121 and 1122 each have an IP address (home address) assigned by the IP packet network of IMT2000 as a managing body, and set/manage a radio access link with a packet data support node (Packet Data Support Node: PDSN) 1106 or 1107 in the place where they have moved via radio base stations 1102 to 1105.

A packet data gateway node (Packet Data Gateway Node: PDGN) 1108 provides the home agent function of the Mobile IP as well as the function of a gateway router for connecting the IMT2000 packet network with an IP core network 1111 such as the Internet.

Each of the packet data support nodes 1106 and 1107 is situated with respect to each specified area in the IMT2000 packet network, and supports a certain number of the radio base stations 1102 to 1105. The packet data support nodes 1106 and 1107 set/manage radio access links with the mobile terminals 1121 and 1122 where they are connected via the radio base stations 1102 to 1105, and also provides the foreign agent function of the Mobile IP. In addition, the packet data support nodes 1106 and 1107 serve as default routers for packets transmitted from the mobile terminals 1121 and 1122.

In the IMT2000 network having this configuration, following processes are performed.

First, the mobile terminal 1121 sets a radio access link with the packet data support node 1106 uniquely designated with respect to each radio base station to send a Mobile IP registration request. Having received the Mobile IP registration request, the packet data support node 1106 forwards the request to the packet data gateway node 1108. When receiving the Mobile IP registration request, the packet data gateway node 1108 manages the association between the IP address of the mobile terminal 1121 and that of the packet data support node 1106 to which the terminal 1121 is currently connected, and returns a Mobile IP registration response to the packet data support node 1106. The packet data support node 1106 forwards the received mobile IP registration response to the mobile terminal 1121, and manages the association between the IP address of the mobile terminal 1121 and the link ID of the radio access link.

The packet data gateway node 1108 catches all IP packets transmitted from a communication party 1112 connected to the IP core network 1111 to the mobile terminal 1121, and forwards the packets to the packet data support node 1106 that serves as the foreign agent of the mobile terminal 1121 by IP tunneling. The packet data support node 1106 reconstructs the IP packets which have undergone the IP tunneling, and forwards the packets to the mobile terminal 1121 via the radio access link with the associative link ID. On the other hand, the packet data support node 1106 performs routing according to their destination and forwards IP packets transmitted from the mobile terminal 1121 to the communication party 1112. Besides, IP packets transmitted from the mobile terminal 1121 to the other mobile terminal 1122 are routed from the packet data support node 1106 that serves as the foreign agent of the mobile terminal 1121 in the transmitting end to the packet data gateway node 1108. The packet data gateway node 1108 forwards the IP packets to the packet data support node 1107 that serves as the foreign agent of the mobile terminal 1122 in the receiving end by IP tunneling. Accordingly, the mobile terminal 1122 receives the IP packets.

Examples of the network protocol for handling the mobile terminals include Mobile IPv4 and Mobile IPv6. However, since the mobile terminals and IPv6 mechanism assume the role of the foreign agent, the foreign agent does not exist in the Mobile IPv6.

Set out below are processes according to the Mobile IPv4 and IPv6.

(1) In the case where the mobile terminal is in the home link

As with the case of ordinary TCP/IP, the mobile terminal communicates with a communication party in the ordinary way.

(When adopting the IPv6, the mobile terminal sends a registration request directly to the home agent.)

(2-1) The arrival of packets

In the IPv6, the mobile terminal that has received packets forwarded by tunneling transmits a new registration request to the communication party that sent the packets, and notifies the communication party of the c/o address. After that, the communication party transmits packets directly to the mobile terminal on the basis of the c/o address.

(2-2) The transmission of packets

When adopting the IPv6, the c/o address is set as the source address, and the home address is indicated as a newly defined Destination option.

PROBLEMS THAT THE INVENTION IS TO SOLVE

With the construction of the IP packet network envisioned for the IMT2000 network based on the Mobile IP, the packet data support node that supports a certain number of radio base stations has the foreign agent function for mobile terminals. Consequently, when IP packets arrive from an outside network all at once at plural mobile terminals in the area covered by the radio base stations belonging to the packet data support node, the load on the packet data support node increases rapidly.

It is therefore an object of the present invention to prevent the concentration of loads on the node that serves as the foreign agent of the mobile terminals.

Besides, the network employing the Mobile IPv4 or IPv6 also has some problems. In the case of IPv4, there is the problem of so-called triangle routing since packets addressed to the mobile terminal are inevitably transmitted via the home agent. In the case of IPv6, in order to solve the triangle routing problem, the mobile terminal which has received packets sent by tunneling notifies the communication party of the c/o address as a binding update option by deciding that the communication party does not know the c/o address, and the communication party transmits packets directly to the mobile terminal according to the c/o address. However, the first packet sent from the communication party that has not yet know the c/o address is inevitably forwarded via the home agent, thus causing signal amount overhead. Moreover, assuming that many communication parties start transmitting packets all at once to the same mobile terminal or plural mobile terminals whose home agents are set on the same node, the load is concentrated on the home agents or relevant nodes.

It is therefore another object of the present invention to provide a mobile terminal management system in which plural communication parties are notified of the latest c/o address of the mobile terminal so that the communication parties can send the first packet directly to the mobile terminal without the intervention of the home agent.

It is yet another object of the present invention to reduce the load on the mobile terminal on the occasion of notifying plural communication parties of the c/o address in advance.

DISCLOSURE OF THE INVENTION

With regard to the Mobile IP, a mobile terminal management system of the present invention comprises a first node which supports a plurality of radio base stations and sets/manages a radio access link with each of mobile terminals connected through the radio base station, and a second node which provides the gateway router function for connecting to IP core network and the home agent function of the mobile terminals. In a mobile communication network providing a mobile communication service to a plurality of mobile terminals, the foreign agent function for some of the mobile terminals is placed in the radio base station which each of the mobile terminals is currently utilizing, and the foreign agent function for other mobile terminals is placed in the first node which supports the radio base stations currently utilized by the mobile terminals.

A decision about whether the foreign agent of each mobile terminal is placed in the radio base station or in the first node is made on the occasion of registering the location of each mobile terminal. The location of the foreign agent of each mobile terminal may be changed during a session between the mobile terminal and its communication party.

A decision about whether the foreign agent of each mobile terminal is placed in the radio base station or in the first node may be made on the basis of information stored in the mobile terminal subscriber data. On this occasion, the decision may be made based on the movement/mobility characteristic of the mobile terminal or the frequency of foreign agent switching per unit of time on the mobile terminal. In addition, the decision may be made based on the model or type of the mobile terminal or availability/use of resources in the packet network of the mobile communication.

Besides, the location of the foreign agent of the mobile terminal may be changed before the next location registration request. On this occasion, the location of the foreign agent of each mobile terminal may be changed during a session between the mobile terminal and its communication party. The location of the foreign agent of the mobile terminal may be changed based on availability/use of resources in the packet network of the mobile communication network or in response to a delay request from the user application of the mobile terminal.

With regard to the network using the Mobile IPv4 and IPv6, in accordance with the present invention, in the network including a plurality of subnetworks interconnected with each other and dealing with mobile terminals each having a c/o address depending on the subnetwork to which the mobile terminal is currently being connected and a home address being independent thereof, when the mobile terminal changes to another subnetwork to be connected, a plurality of communication parties are notified of a pair of the latest c/o address and home address of the mobile terminal. More concretely, the mobile terminal comprises a means for storing and managing a communication party list, and a means for transmitting a binding update request to report the new c/o address with the communication party list when the connected subnetwork changes, and is provided with an agent for receiving the binding update request and notifying the respective communication parties in the communication party list of the pair of the latest c/o address and home address.

The means for storing and managing the communication party list includes a means for creating a list of a fixed number of the most communicated communication parties by monitoring communications on the mobile terminal.

The present invention is applicable to the network based on the Mobile IPv6 as well as the mobile IPv4. In the case of the Mobile IPv6, the agent corresponds to the home agent of the mobile terminal, while in the case of the Mobile IPv4, the agent corresponds to the home agent or foreign agent of the mobile terminal.

FUNCTION

With regard to the Mobile IP, in the mobile terminal management system according to the present invention, the foreign agent functions of plural mobile terminals are distributed to the first node and each radio base station belonging to the first node. Thus, even when IP packets arrive all at once at the plural mobile terminals in the area covered by the radio base stations belonging to the first node from an IP core network such as the Internet, it is possible to prevent the concentration of loads on the nodes that provide the foreign agent function (radio base stations and first node).

With regard to the network using the Mobile IPv4 and IPv6, in accordance with the present invention, a plurality of communication parties such as a fixed number of the most communicated communication parties are notified of a pair of the latest c/o address and home address of the mobile terminal when the mobile terminal changes to another subnetwork to be connected. Consequently, the respective communication parties can transmit the first packet directly to the c/o address, which prevents the concentration of loads on the home agent and relevant nodes.

BRIEF DESCRIPTION OF THE DRAWINGS

FIG. 10 is a diagram showing the configuration of a system according to an embodiment of the present invention.

FIG. 11 is a diagram showing the configuration of a communication party list.

FIGS. 14(a) and (b) are diagrams showing an example of the format of a packet for a binding update request sent from the mobile terminal to the home agent or from the home agent to the communication party.

FIG. 18 is a diagram illustrating a method for sorting entries in an extracted part associative memory and a cyclic part associative memory, which constitute an association table of the communication party list storing/managing mechanism.

Figure 1:
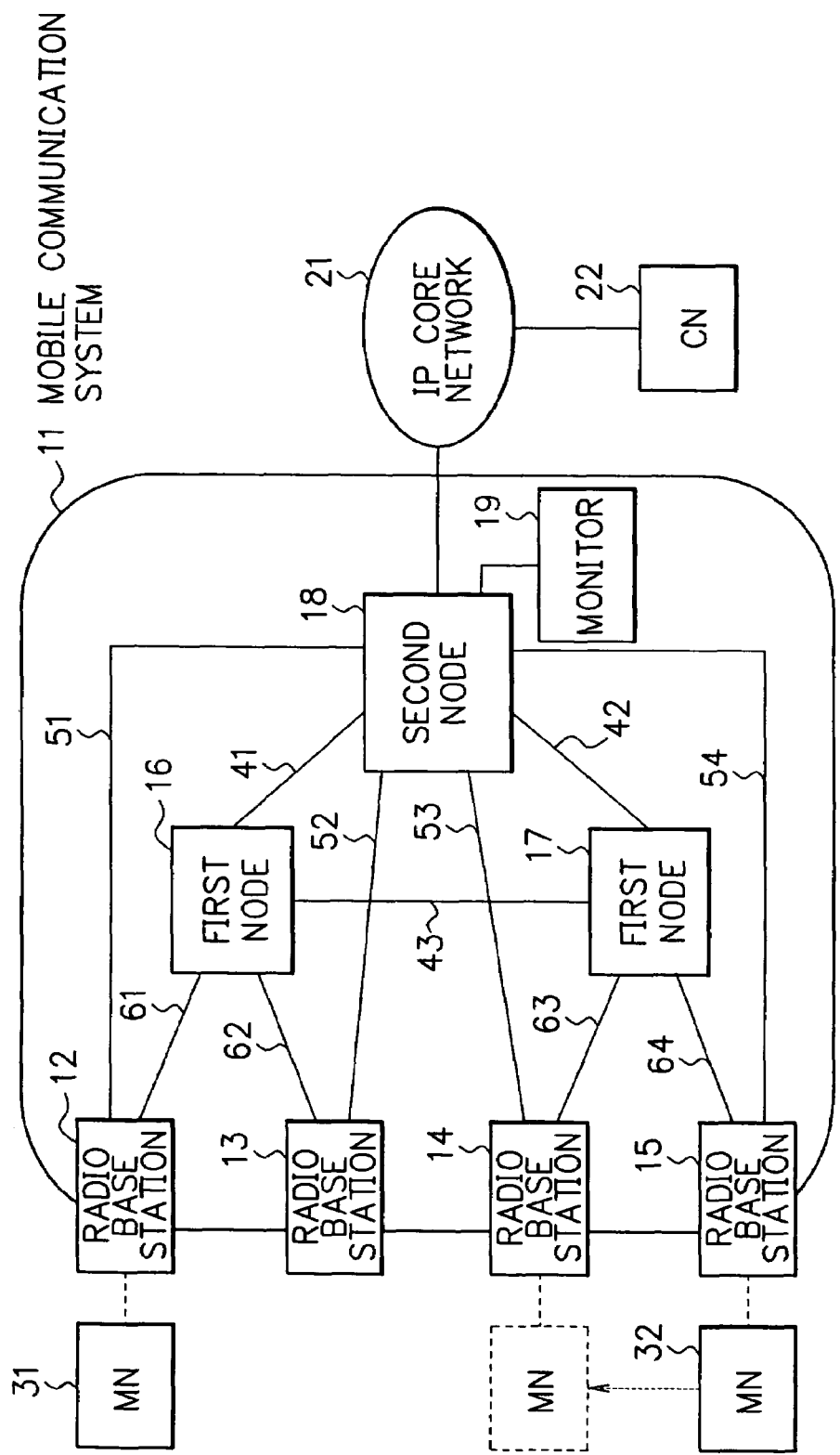
FIG. 1 is a diagram showing the configuration of a system according to an embodiment of the present invention.

Incidentally, the numeral 11 represents a mobile communication system. The numerals 12 to 15 represent radio base stations. The numerals 16 and 17 represent first nodes. The numeral 18 represents a second node. The numeral 19 represents a monitor. The numeral 21 represents an IP core network. The numeral 22 represents a communication party (CN). The numerals 31 and 32 represent mobile terminals (MN). The numerals 41 to 43, 51 to 54, and 61 to 64 represent paths.

The numeral 200 represents an IP core network. The numeral 201 represents a home link (HL) for the mobile terminal 204. The numerals 202 and 203 represent foreign links (FL) for the mobile terminal 204. The numeral 204 represents a mobile terminal (MN). The numerals 205 and 207 represent communication parties (CN) of the mobile terminal 204. The numeral 206 represents a home agent (HA).

BEST MODE FOR CARRYING OUT THE INVENTION

First Embodiment

Referring to the drawings, a description will now be made in detail of preferred embodiments of the present invention.

FIG. 1 is a diagram showing the configuration of a system according to the first embodiment of the present invention. Referring to FIG. 1, a mobile communication system 11 comprises radio base stations 12 to 15, a first node 16 provided for the radio base stations 12 and 13, a first node 17 provided for the radio base stations 14 and 15, a second node 18 connected to an outside IP core network 21 and a monitor 19 connected with the second node 18, and offers mobile communication service through packet communication to mobile terminals 31 and 32. In the case where the mobile communication system 11 is IMT2000, the first nodes 16 and 17 correspond to the packet data service node, the second node 18 corresponds to the packet data gateway node, and the IP core network 21 corresponds to the outside Internet.

The mobile terminals 31 and 32 each have an IP address (home address) assigned by the mobile communication system 11 as a managing body, and are equivalent to the mobile terminal of the Mobile IP. In addition, the mobile terminals 31 and 32 set and manage radio access links with the first nodes 10 and 17 via the nearest radio base stations 12 to 15.

The second node 18 provides the home agent function of the Mobile IP as well as the gateway router function for connecting the packet network of the mobile communication system 11 and the IP core network 21. Additionally, the second node 18 has a function for determining to place the foreign agent functions of the respective mobile terminals 31 and 32 in one of the radio base stations 12 to 15, the first node 16 or the first node 17. The second node 18 is connected to the first nodes 16 and 17 via paths 41 and 42, respectively, and also connected directly to the radio base stations 12, 13, 14 and 15 via paths 51, 52, 53 and 54, respectively.

Each of the first nodes 16 and 17 is situated with respect to each specified area in the packet network of the mobile communication system 11, and supports a certain number (in FIG. 1, two radio base stations) of the radio base stations 12 to 15. The first node 16 and 17 set/manage radio access links with the mobile terminals 31 and 32 where the nodes 16 and 17 are connected via the radio base stations 12 to 15, and also provides the foreign agent function of the Mobile IP. In addition, the first nodes 16 and 17 have the IP routing function for packets transmitted from the mobile terminals 31 and 32. The first node 16 is connected to the second node 18, the first node 17, the radio base station 12, and the radio base station 13 via paths 41, 43, 61 and 62, respectively. The first node 17 is connected to the second node 18, the first node 16, the radio base station 14, and the radio base station 15 via paths 42, 43, 63 and 64, respectively.

Each of the radio base stations 12 to 15 is situated with respect to each specified area in the radio zone, and linked with the mobile terminals 31 and 32 through the radio access links. The radio base stations 12 to 15 are also connected to the first nodes 16 and 17. The radio base stations 12 to 15 provide the IP routing function in addition to the foreign agent function of the Mobile IP.

Figure 2:
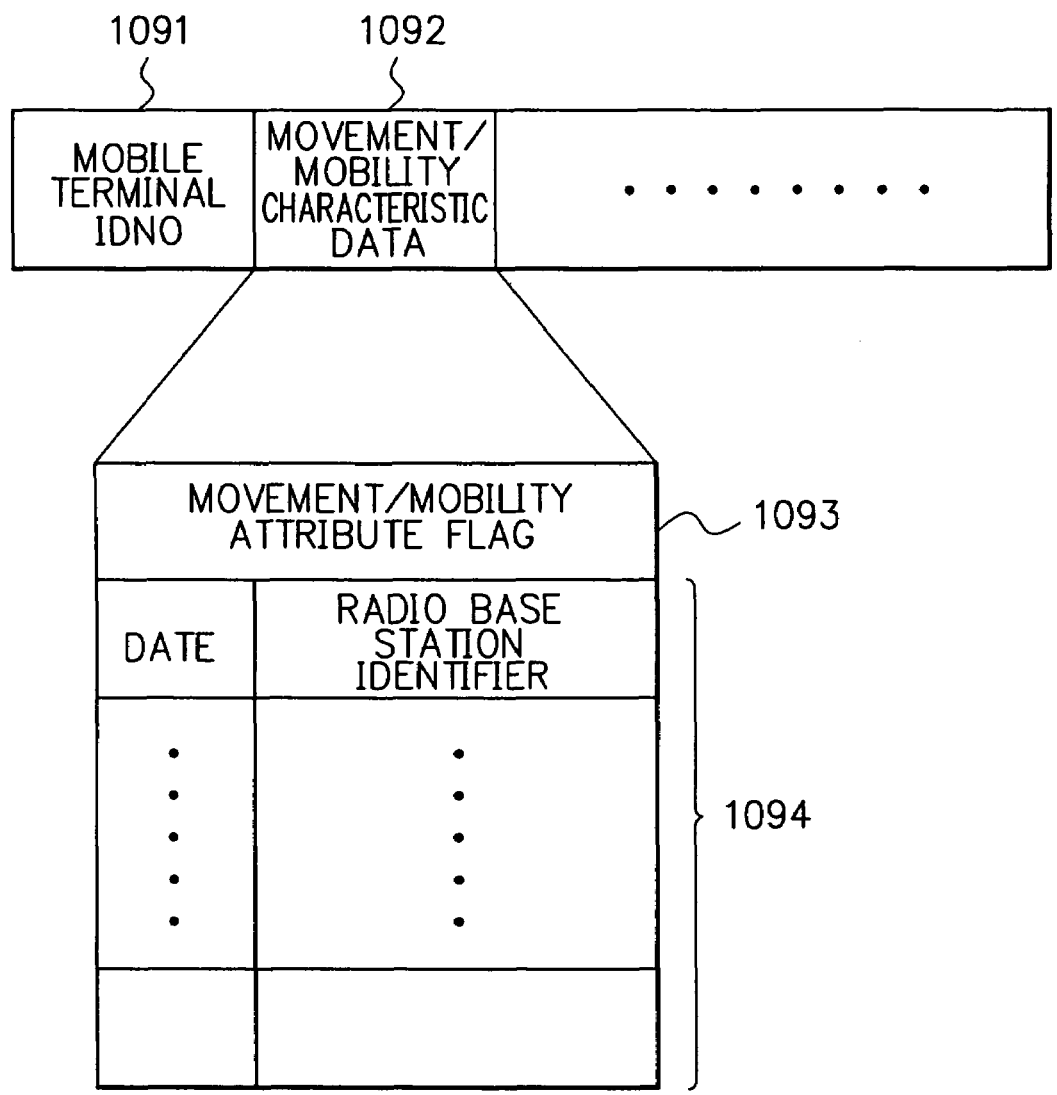
FIG. 2 is a diagram showing an example of the content of mobile terminal subscriber data stored and managed by a monitor.

The monitor 19 stores and manages subscriber data with respect to each of the mobile terminals 31 and 32. FIG. 2 shows an example of the subscriber data of one mobile terminal. Mobile terminal IDNO (identification number) 1091 is a number for uniquely identifying the mobile terminal, and the subscriber data including movement/mobility characteristic data 1092 are stored correspondingly to the mobile terminal IDNO 1091. The movement/mobility characteristic data 1092 shows the movement/mobility characteristic of the mobile terminal in the past fixed period of time. The movement/mobility characteristic data 1092 includes a list 1094 that contains the identifiers of the utilized radio base stations with the utilization date and a movement/mobility attribute flag 1093 of the mobile terminal determined from the list 1094. The movement/mobility attribute flag 1093 is, for example, set to "0" indicating that the mobile terminal makes a small number of moves or no move when the mobile terminal has changed radio base stations less frequently than a prescribed threshold in the past fixed period of time, while it is set to "1" indicating that the mobile terminal makes a large number of moves or sometime makes moves when the frequency of radio base station changes exceeds the threshold. The movement/mobility characteristic data 1092 is updated and referred to when the mobile terminal requests Mobile IP registration.

FIGS. 3 to 8 are the process sequence diagrams according to the first embodiment of the present invention, and shows examples of processes performed by the mobile terminal, first and second nodes and communication party. Incidentally, those processes are executed by computers constituting the mobile terminal, first and second nodes and communication party under the control of programs stored in their memories. In the following, the operation of this embodiment will be explained with reference to the respective drawings.

First, referring to FIG. 3, a description will be given of the process for placing the foreign agent function of the mobile terminal in the radio base station by taking the mobile terminal 31 in FIG. 1 as an example.

For a start, the mobile terminal 31 sets a radio access link with the first node 16 in charge of the nearest radio base station 12 via the radio base station 12 (S101). Next, the mobile terminal 31 sends a Mobile IP registration request to the first node 16 through the radio access link (S102). The Mobile IP registration request involves setting the IP address and identifier of the mobile terminal 31. Having received the Mobile IP registration request, the first node 16 forwards the request to the second node 18 with a radio base station identifier for specifying the radio base station 12 (S103).

When receiving the Mobile IP registration request, the second node 18 determines where to locate the foreign agent of the mobile terminal 31 (S104). Concretely, the second node 18 gains access to subscriber data corresponding to the identifier of the mobile terminal 31 set in the request through the monitor 19, and registers a pair of the identifier of the radio base station 12 set in the request and current date in the list 1094. After that, the second node 18 finds out the frequency of changes in radio base stations used by the mobile terminal in the past fixed period of time from the list 1094, and compares the frequency with a prescribed threshold. When the frequency is below the threshold, the second node 18 sets the value of the movement/mobility attribute flag 1093 to "0", while the value is set to "1" when the frequency exceeds the threshold. The second node 18 determines to place the agent in the radio base station when the value of the movement/mobility attribute flag 1093 is "0". On the other hand, the second node 18 determines to place the agent in the first node that supports the radio base station when the value is "1". Hereinafter, description will be given on the assumption that the value of the movement/mobility attribute flag 1093 for the mobile terminal 31 is "0" and the foreign agent function of the mobile terminal 31 is placed in the radio base station 12.

The second node 18 manages the association between the IP address of the mobile terminal 31 and that of the foreign agent (in this case, the radio base station 12 indicated by the radio base station identifier set in the registration request) by its internal memory which is not seen in the drawing (S105). Incidentally, since the second node 18 knows the IP addresses of the radio base stations 12 to 15, the first nodes 16 and 17 in advance, the second node 18 uses one of the addresses as the IP address of the foreign agent. Subsequently, the second node 18 transmits the Mobile IP registration request that specifies the identifier and IP address of the mobile terminal 31 to the radio base station 12 determined to be the foreign agent (S106). The transmission is directly made via the path 51.

Having received the Mobile IP registration request, the radio base station 12 manages the association between the IP address of the mobile terminal 31 specified by the request and the link ID of the radio access link set between the mobile terminal 31 and the first node 16 by its internal memory which is not seen in the drawing, and generates the foreign agent function of the mobile terminal 31 in itself (S107). That is, the radio base station 12 instantiates the foreign agent. After that, the radio base station 12 transmits a Mobile IP registration response that specifies its identifier to the mobile terminal 31 (S108). The mobile terminal 31 acknowledges the completion of the Mobile IP registration request and the radio base station 12 as the foreign agent by the reception of the registration response.

Next, a description will be given of the process for placing the foreign agent function of the mobile terminal in the first node by taking the mobile terminal 32 in FIG. 1 for example with reference to FIG. 4.

Figure 3:
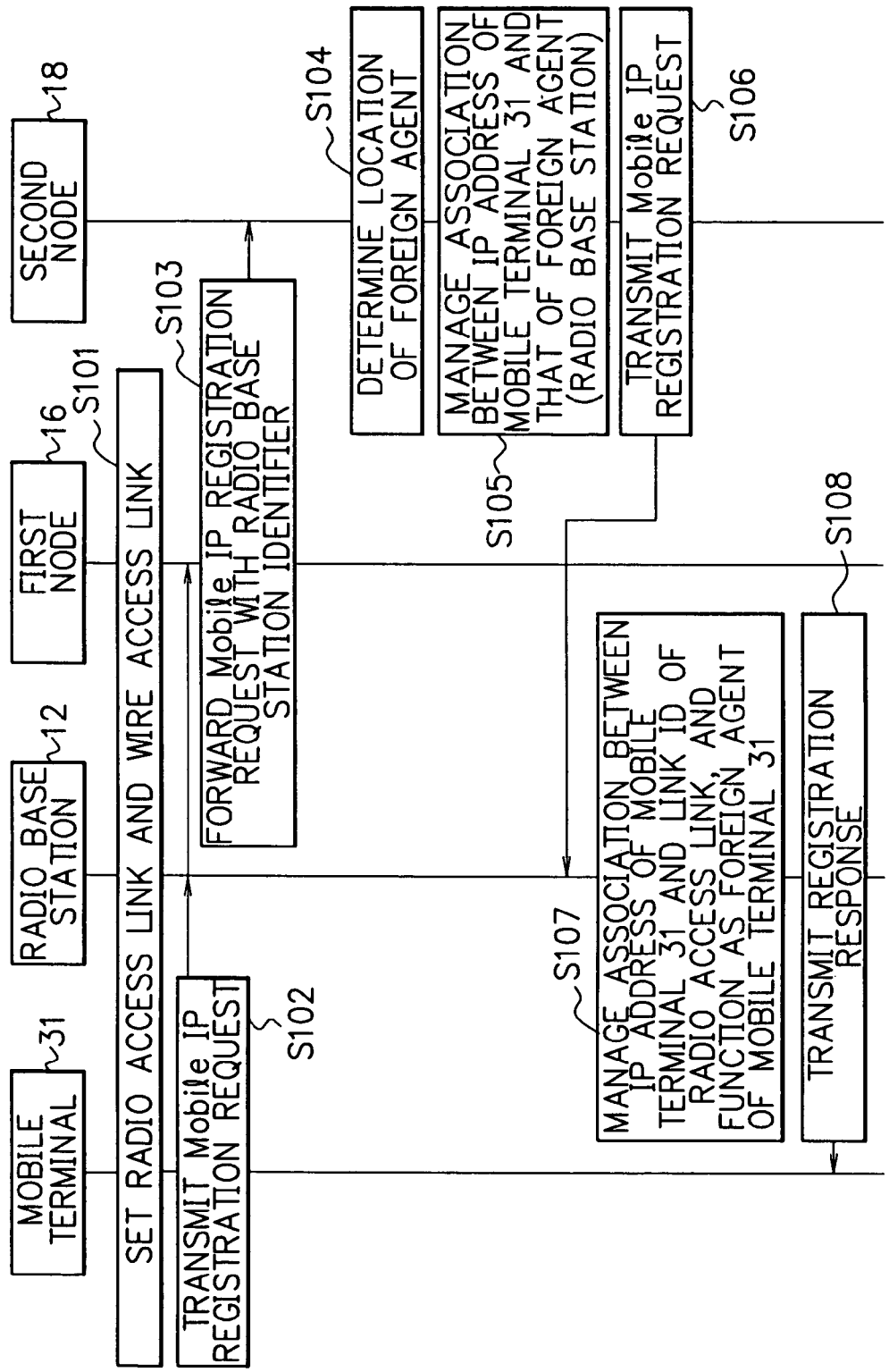
FIG. 3 is a sequence diagram showing process for locating the foreign agent function of the mobile terminal in a radio base station according to an embodiment of the present invention.
Figure 4:
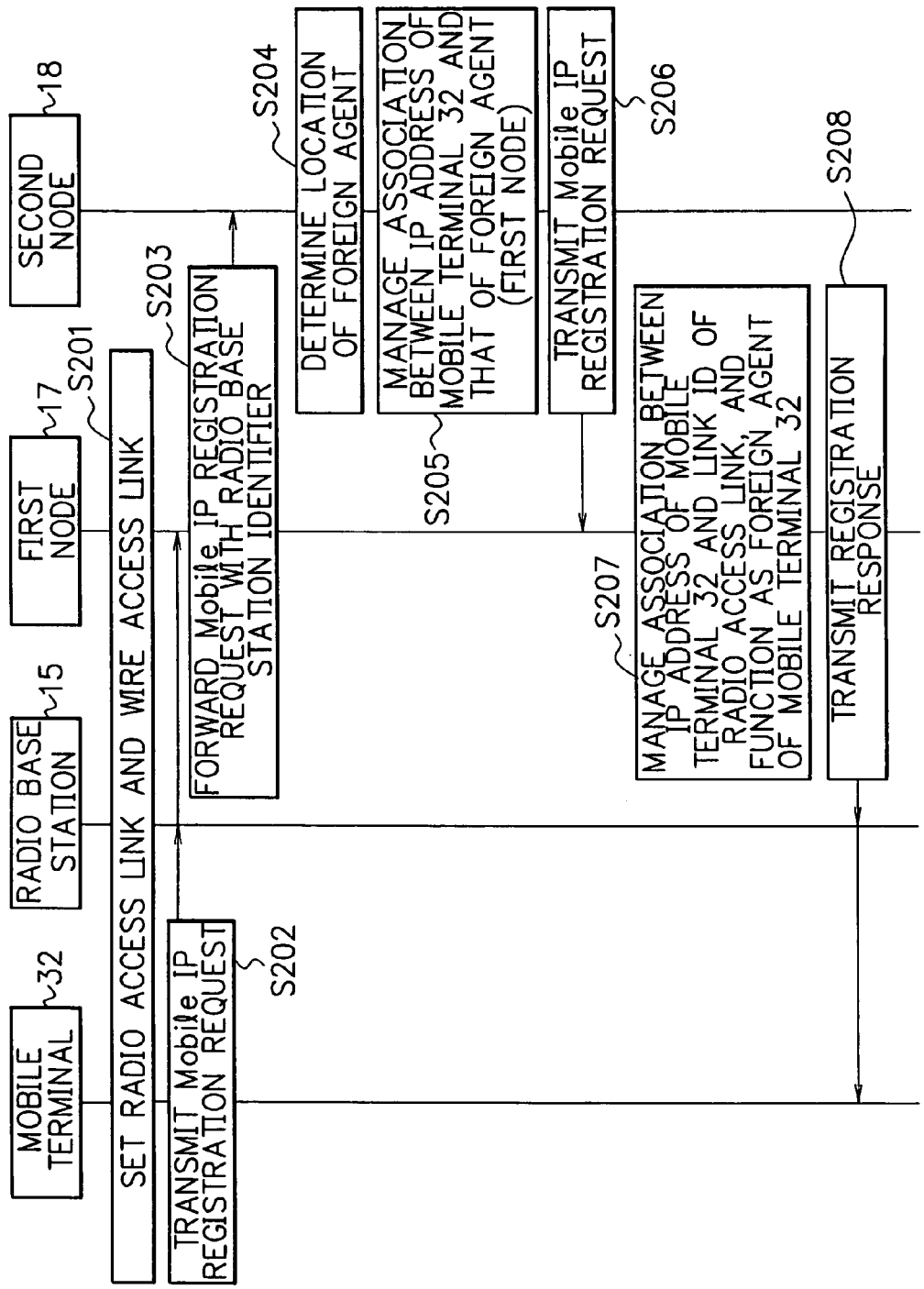
FIG. 4 is a sequence diagram showing process for locating the foreign agent function of the mobile terminal in a first node according to an embodiment of the present invention.

In FIG. 4, procedural steps S201 to 203, in which the mobile terminal 32 sets a radio access link with the first node 17 via the nearest radio base station 15 and sends a Mobile IP registration request to the second node 18, are similar to procedural steps S101 to 103 in FIG. 3. Having received the Mobile IP registration request, the second node 18 gains access to subscriber data corresponding to the identifier of the mobile terminal 32 set in the request through the monitor 19, and registers a pair of the identifier of the radio base station 15 and current date in the list 1094. After that, the second node 18 updates the movement/mobility attribute flag 1093 if necessary, and determines where to place the foreign agent function of the mobile terminal 32 according to the updated movement/mobility attribute flag 1093 (S204). Hereinafter, description will be given on the assumption that the value of the movement/mobility attribute flag 1093 is "1" and the foreign agent function of the mobile terminal 32 is placed in the first node 17.

The second node 18 manages the association between the IP address of the mobile terminal 32 and that of the foreign agent (in this case, the first node 17 that forwarded the registration request) by its internal memory which is not seen in the drawing (S205). Subsequently, the second node 18 transmits a Mobile IP registration response that specifies the identifier and IP address of the mobile terminal 32 to the first node 17 determined to be the foreign agent (S206).

Having received the Mobile IP registration response, the first node 17 manages the association between the IP address of the mobile terminal 32 specified by the response and the link ID of the radio access link set between the mobile terminal 32 and the first node 17 by its internal memory which is not seen in the drawing, and generates the foreign agent function of the mobile terminal 32 in itself (S207). After that, the first node 17 transmits the Mobile IP registration response that specifies its identifier to the mobile terminal 32 via the radio base station 15 (S208). The mobile terminal 32 acknowledges the completion of the Mobile IP registration request and recognizes the first node as the foreign agent by the reception of the registration response.

Figure 5:
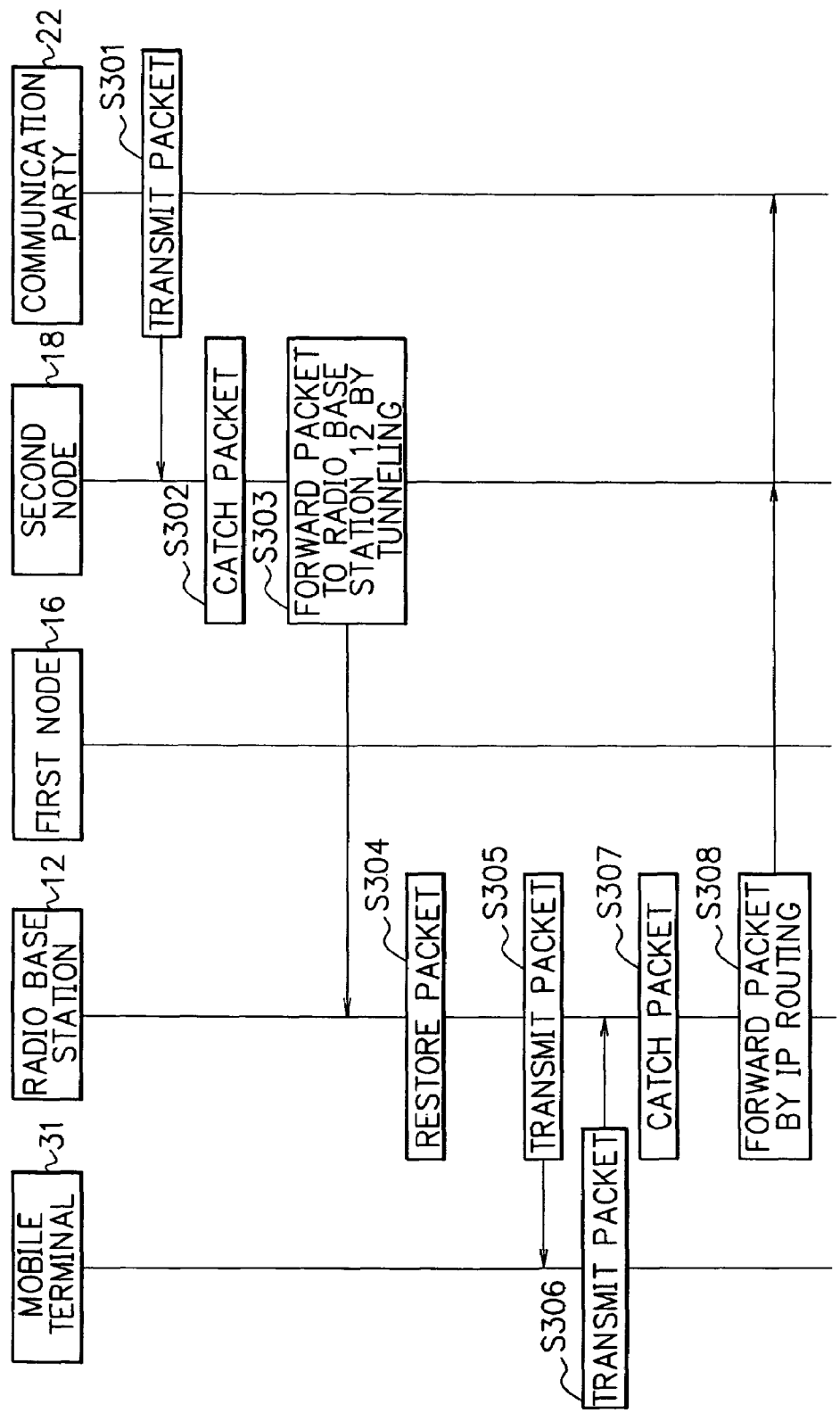
FIG. 5 is a sequence diagram showing process during packet communication between the mobile terminal and its communication party when the foreign agent function of the mobile terminal is placed in the radio base station.

In the following, a description will be given of the process during packet communication between the mobile terminal 31 whose foreign agent function is placed in the radio base station 12 and the communication party 22 connected to the IP core network 21 with reference to FIG. 5.

When the communication party 22 transmits a packet in which the IP address of the mobile terminal 31 is set as a destination IP address to the IP core network 21 (S301), the second node 18 that has the home agent function of the mobile terminal 31 catches the packet (S302). The second node 18 refers to the internal memory for the IP address of the foreign agent (in this case, the radio base station 12) corresponding to the destination IP address of the packet, and adds a tunneling header, which contains the IP address of the radio base station 12 as a destination IP address and the IP address of the second node 18 as a source IP address, to the top of the packet to forward the packet to the radio base station 12 by tunneling (S303).

The radio base station 12 eliminates the tunneling header from the packet to restore the packet to its original form (S304), and refers to the internal memory for the link ID of the radio access link corresponding to the destination IP address of the packet to forward the packet to the mobile terminal 31 via the radio access link having the relevant link ID (S305).

On the other hand, when the mobile terminal 31 transmits a packet to the communication party 22 via the radio access link (S306), the radio base station 12 having the foreign agent function of the mobile terminal 31 catches the packet (S307), and forwards the packet directly to the communication party 22 by the method of IP routing (S308).

Figure 6:
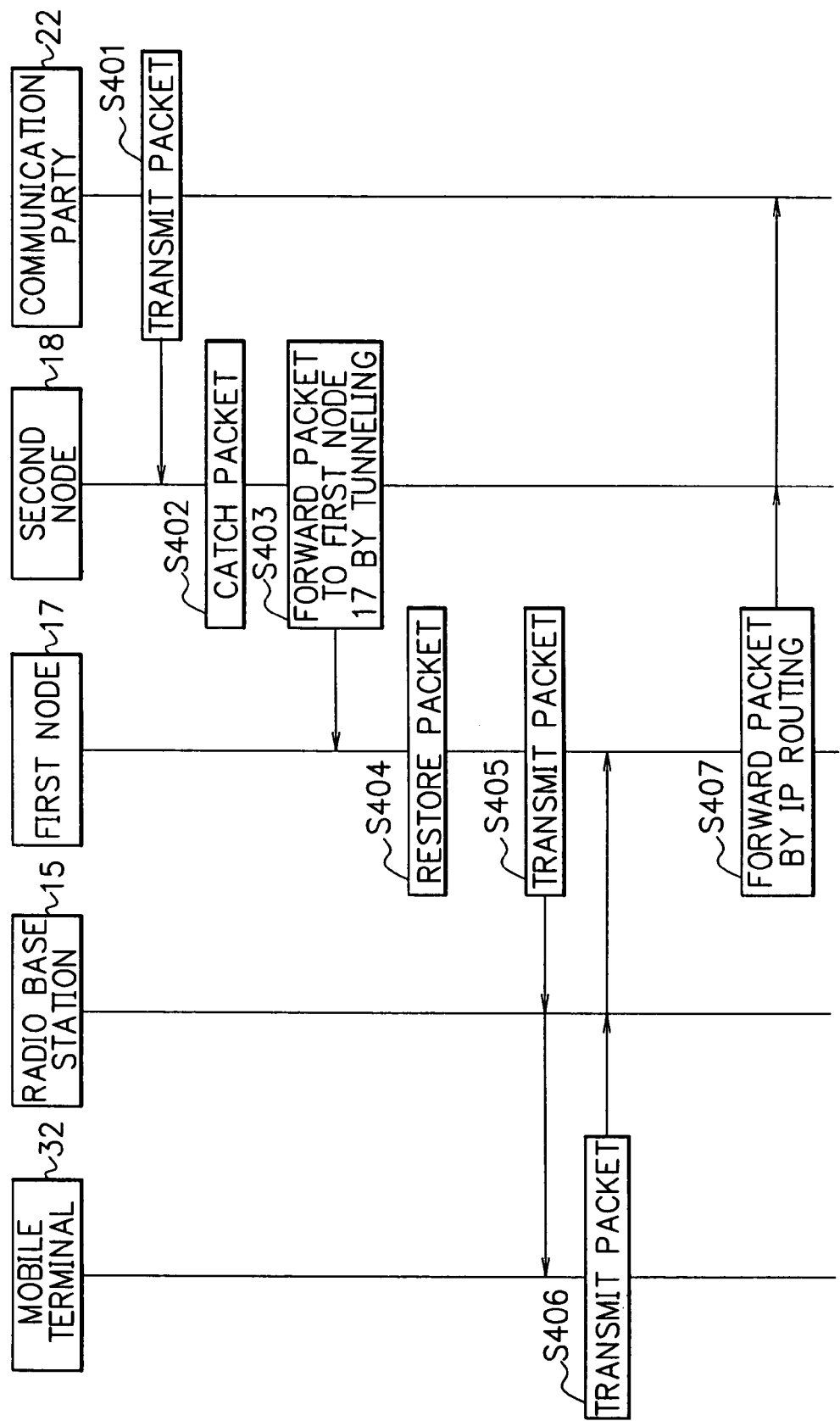
FIG. 6 is a sequence diagram showing process during packet communication between the mobile terminal and its communication party when the foreign agent function of the mobile terminal is placed in the first node.

Next, a description will be given of the process during packet communication between the mobile terminal 32 whose foreign agent function is placed in the first node 17 and the communication party 22 connected to the IP core network 21 with reference to FIG. 6.

When the communication party 22 transmits a packet in which the IP address of the mobile terminal 32 is set as a destination IP address to the IP core network 21 (S401), the second node 18 that has the home agent function of the mobile terminal 32 catches the packet (S402). The second node 18 refers to the internal memory for the IP address of the foreign agent (in this case, the first node 17) corresponding to the destination IP address of the packet, and adds a tunneling header, which contains the IP address of the first node 17 as a destination IP address and the IP address of the second node 18 as a source IP address, to the top of the packet to forward the packet to the first node 17 by tunneling (S403).

The first node 17 eliminates the tunneling header from the packet to restore the packet to its original form (S404), and refers to the internal memory for the link ID of the radio access link corresponding to the destination IP address of the packet to forward the packet to the mobile terminal 32 via the radio access link having the relevant link ID (S405).

On the other hand, when the mobile terminal 32 transmits a packet to the communication party 22 via the radio access link (S406), the radio base station 15 not having the foreign agent function of the mobile terminal 32 does not catch the packet, and the packet is received by the first node 17. The first node 17 forwards the packet directly to the communication party 22 by the method of IP routing (S407).

Figure 7:
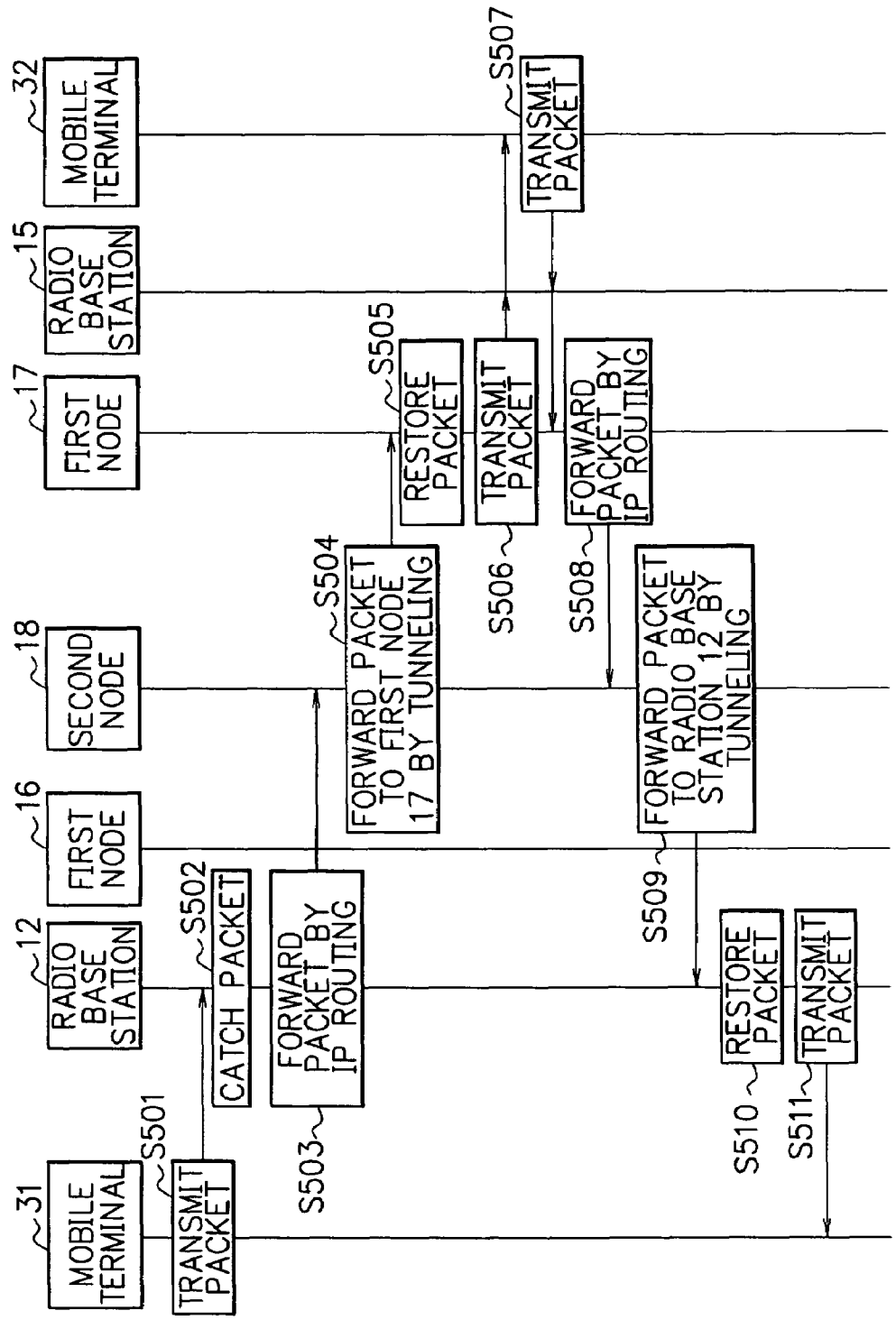
FIG. 7 is a sequence diagram showing process during packet communication between the mobile terminals whose foreign agent functions are placed in the radio base station and the first node, respectively.

In the following, a description will be given of the process during packet communication between the mobile terminal 31 whose foreign agent function is placed in the radio base station 12 and the mobile terminal 32 whose foreign agent function is placed in the first node 17 with reference to FIG. 7.

When the mobile terminal 31 transmits a packet in which the IP address of the mobile terminal 32 is set as a destination IP address (S501), the radio base station 12 that has the foreign agent function of the mobile terminal 31 catches the packet (S502), and forwards the packet directly to the second node 18 which is the home agent of the mobile terminal 32 by the method of IP routing (S503). The second node 18 refers to the internal memory for the IP address of the foreign agent (in this case, the first node 17) corresponding to the destination IP address of the packet, and adds a tunneling header, which contains the IP address of the first node 17 as a destination IP address and the IP address of the second node 18 as a source IP address, to the top of the packet to forward the packet to the first node 17 by tunneling (S504). The first node 17 eliminates the tunneling header from the packet to restore the packet to its original form (S505), and refers to the internal memory for the link ID of the radio access link corresponding to the destination IP address of the packet to forward the packet to the mobile terminal 32 via the radio access link having the relevant link ID (S506).

On the other hand, when the mobile terminal 32 transmits a packet to the mobile terminal 31 via the radio access link (S507), the radio base station 15 not having the foreign agent function of the mobile terminal 32 does not catch the packet, and the packet is received by the first node 17. The first node 17 forwards the packet directly to the second node 18 that is the home agent of the mobile terminal 31 by the method of IP routing (S508). The second node 18 refers to the internal memory for the IP address of the foreign agent (in this case, the radio base station 12) corresponding to the destination IP address of the packet, and adds a tunneling header, which contains the IP address of the radio base station 12 as a destination IP address and the IP address of the second node 18 as a source IP address, to the top of the packet to forward the packet to the radio base station 12 by tunneling (S509). The radio base station 12 eliminates the tunneling header from the packet to restore the packet to its original form (S510), and refers to the internal memory for the link ID of the radio access link corresponding to the destination IP address of the packet to forward the packet to the mobile terminal 31 via the radio access link having the relevant link ID (S511).

Next, a description will be given of the process for switching the foreign agent around when the mobile terminal moves from one radio base station to another. There are following variations in the foreign agent switching.

(1) In the case where the mobile terminal moves between the radio base stations belonging to the same first node (A) When the foreign agent has been placed in the radio base station in which the mobile terminal communicated before making a move:

(a) the foreign agent is relocated in the radio base station in which the mobile terminal communicates after making a move; or (b) the foreign agent is relocated in the first node.

(B) When the foreign agent has been placed in the first node:

(a) the foreign agent is relocated in the radio base station in which the mobile terminal communicates after making a move. Incidentally, when the foreign agent is not relocated in the radio base station, that is, when the foreign agent is left in the first node, the foreign agent switching does not occur.

(2) In the case where the mobile terminal moves between the radio base stations belonging to different first nodes (A) When the foreign agent has been placed in the radio base station in which the mobile terminal communicated before making a move:

(a) the foreign agent is relocated in the radio base station in which the mobile terminal communicates after making a move; or (b) the foreign agent is relocated in the first node which supports the radio base station in which the mobile terminal communicates after making a move.

(B) When the foreign agent has been placed in the first node which supports the radio base station in which the mobile terminal communicated before making a move:

(a) the foreign agent is relocated in the radio base station in which the mobile terminal communicates after making a move; or (b) the foreign agent is relocated in the first node which supports the radio base station in which the mobile terminal communicates after making a move.

Figure 8:
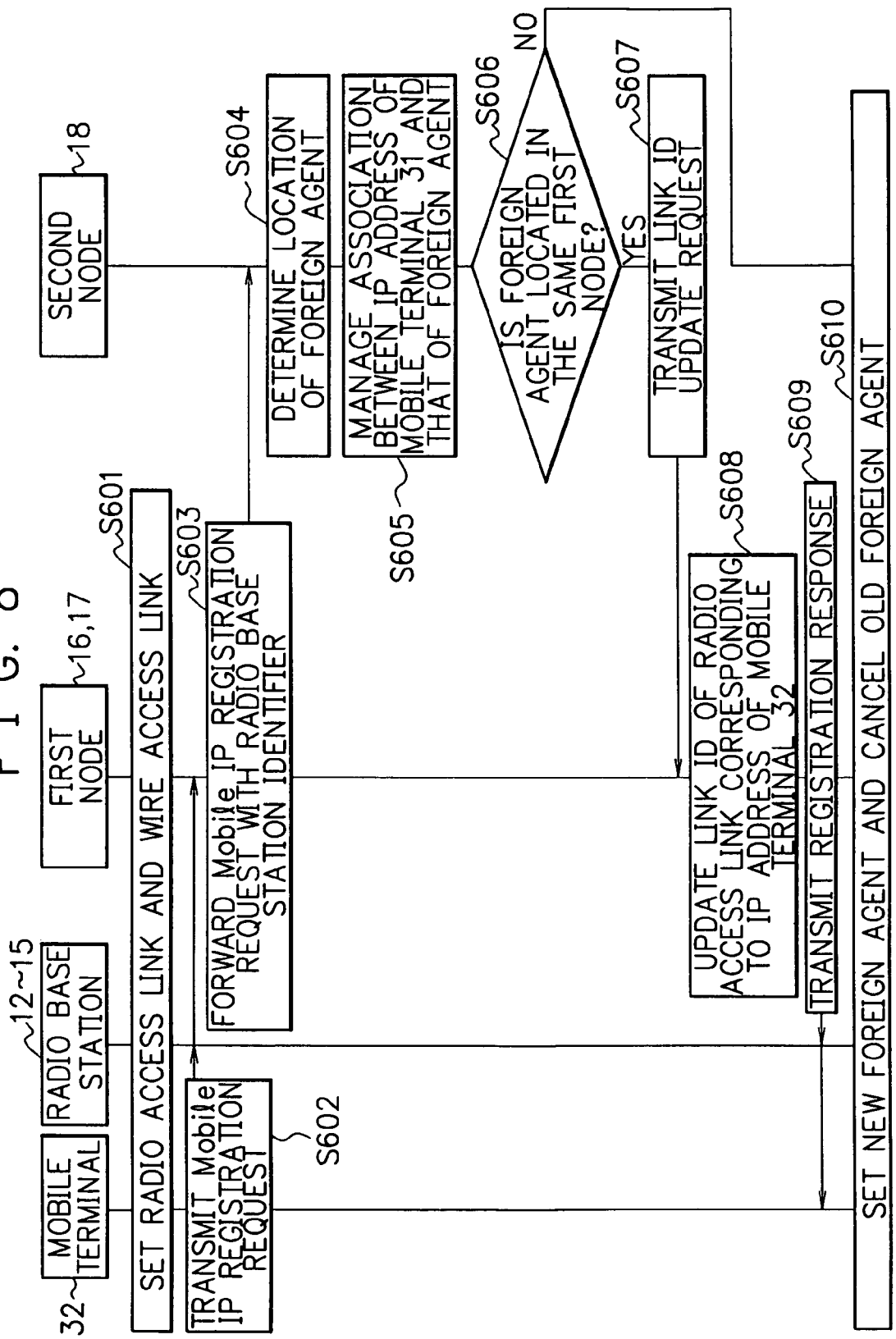
FIG. 8 is a sequence diagram showing process for switching the foreign agent around when the mobile terminal moves from one radio base station to another.
Figure 9:
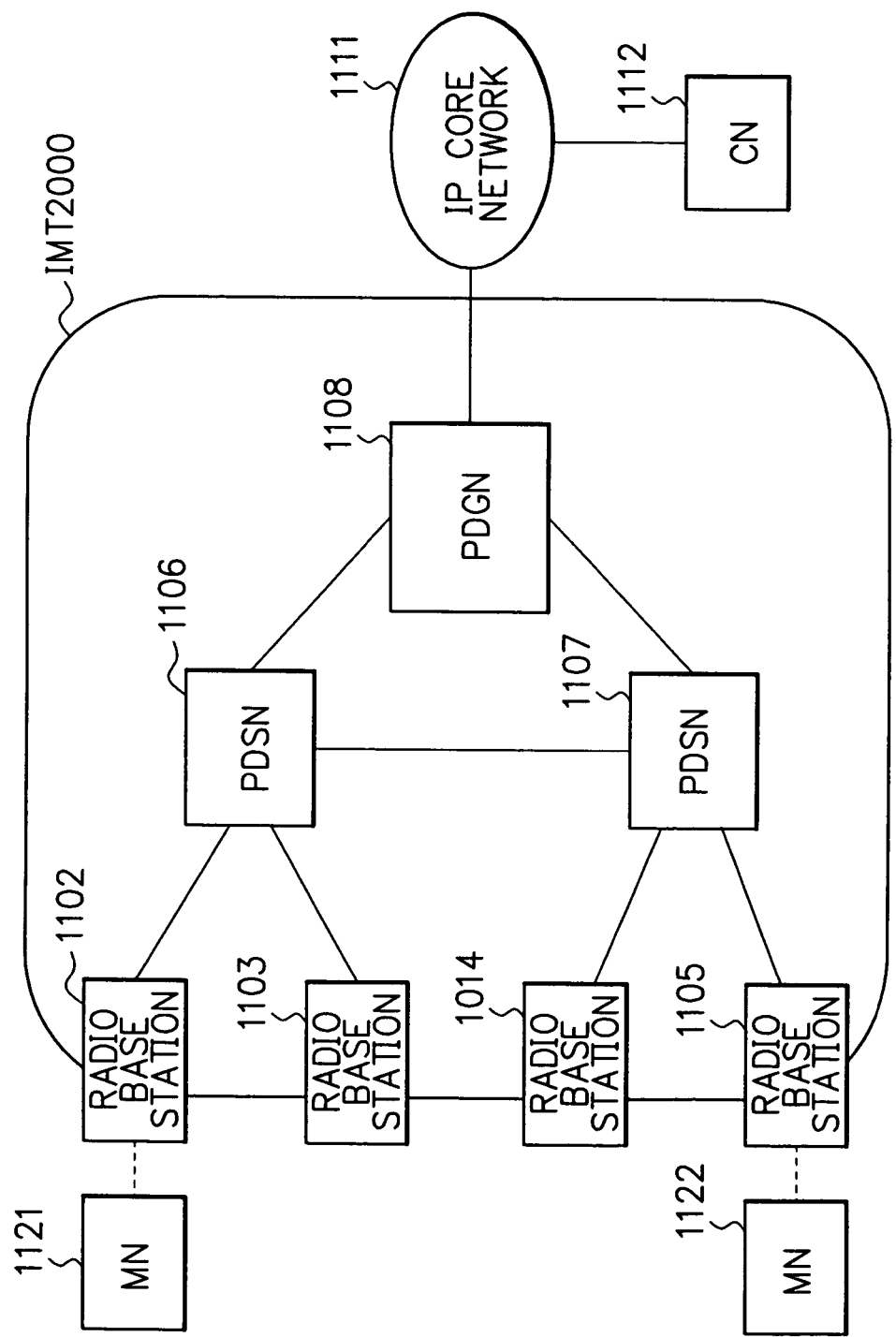
FIG. 9 is a diagram showing the configuration of an IP packet network envisioned for the IMT2000 network.

In the following, a description will be given of the process for switching the foreign agent around when the mobile terminal moves from one radio base station to another by taking the mobile terminal 32 as an example with reference to FIG. 8.

When the mobile terminal 32 moves from the radio base station 15 to the other radio base station 1 i (i=2, 3 or 4), the radio access link is reset between the mobile terminal 32 and the first node 1j (j=6 or 7) that supports the radio base station 1 i via the radio base station 1 i (S601). After the new radio access link has been set, the mobile terminal 32 sends a Mobile IP registration request to the first node 1 j through the new radio access link (S602). The Mobile IP registration request involves setting the IP address and identifier of the mobile terminal 32. Having received the Mobile IP registration request, the first node 1 j forwards the request to the second node 18 with a radio base station identifier for specifying the radio base station 1 i (S603).

When receiving the Mobile IP registration request, the second node 18 gains access to subscriber data corresponding to the identifier of the mobile terminal 32 added to the request through the monitor 19, and updates the movement/mobility characteristic data 1092 as is described above, thereby determining the location of the foreign agent function for the mobile terminal 32 (S604). Subsequently, the second node 18 updates the current association between the IP address of the mobile terminal 32 and that of the foreign agent according to the determined location of the foreign agent function (S605). After that, the second node 18 judges whether or not the foreign agent is located in the first node 17 once again (S606), and operates according to the judgment result.

In the case where the mobile terminal 32 moves from the radio base station 15 to the radio base station 14 and the value of the movement/mobility attribute flag 1093 is "1" when its foreign agent function is placed in the first node 17 (S606, YES), the second node 18 sends a link ID update request specifying the IP address of the mobile terminal 32 to the first node 17 (S607). Having received the link ID update request, the first node 17 updates the link ID of the radio access link corresponding to the IP address of the mobile terminal 32 and corrects it to the link ID of the new radio access link with the mobile terminal 32 (S608). Then, the first node 17 transmits a registration response to the mobile terminal 32 via the radio access link (S609). Accordingly, in the case where the mobile terminal 32 moves from the radio base station 15 to the radio base station 14 while having a session with the communication party 22, the route for communicating packets between the mobile terminal 32 and communication party 22 is changed from one by way of the radio base station 15 to one by way of the radio base station 14.

When judging that the location of the foreign agent of the mobile terminal 32 is not the same as the previous location at step S606, the second node 18 sets a new foreign agent and cancels (clears) the old one in cooperation with the radio base station and first node (S610). In the following, the process at step S610 will be explained in detail.

(1) In the case where the mobile terminal 32 moves from the radio base station 15 to the radio base station 14 belonging to the first node 17

(A) When the foreign agent has been placed in the radio base station 15 in which the mobile terminal 32 communicated before making a move:

(a) the foreign agent is relocated in the radio base station 14, in which case, the foreign agent function of the mobile terminal 32 is generated in the radio base station 14 by following the same procedure as with steps S106 to S108 in FIG. 3 and the foreign agent function of the mobile terminal 32 that has been placed in the radio base station 15 is canceled, and accordingly, for example, when the mobile terminal 32 moves from the radio base station 15 to the radio base station 14 while having a session with the communication party 22, the route for communicating packets between the mobile terminal 32 and communication party 22 is changed from one by way of the radio base station 15 (mobile terminal 32←→radio base station 15←→second node 18) to one by way of the radio base station 14 (mobile terminal 32←→radio base station 14←→second node 18); or (b) the foreign agent is relocated in the first node 17, in which case, the foreign agent function of the mobile terminal 32 is generated in the first node 17 by following the same procedure as with steps S206 to S208 in FIG. 4 and the foreign agent function of the mobile terminal 32 that has been placed in the radio base station 15 is canceled, and accordingly, for example, when the mobile terminal 32 moves from the radio base station 15 to the radio base station 14 while having a session with the communication party 22, the route for communicating packets between the mobile terminal 32 and communication party 22 is changed from one by way of the radio base station 15 (mobile terminal 32←→radio base station 15←→second node 18) to one by way of the radio base station 14 and the first node 17 (mobile terminal 32←→radio base station 14←→first node 17←→second node 18).

(B) When the foreign agent has been placed in the first node 17:

(a) the foreign agent is relocated in the radio base station 14, in which case, the foreign agent function of the mobile terminal 32 is generated in the radio base station 14 by following the same procedure as with steps S106 to S108 in FIG. 3 and the foreign agent function of the mobile terminal 32 that has been placed in the first node 17 is canceled, and accordingly, for example, when the mobile terminal 32 moves from the radio base station 15 to the radio base station 14 while having a session with the communication party 22, the route for communicating packets between the mobile terminal 32 and communication party 22 is changed from one by way of the radio base station 15 and the first node 17 (mobile terminal 32←→radio base station 15←→first node 17←→second node 18) to one by way of the radio base station 14 (mobile terminal 32←→radio base station 14←→second node 18).

(2) In the case where the mobile terminal 32 moves from the radio base station 15 to another radio base station (e.g. radio base station 13) belonging to the first node 16

(A) When the foreign agent has been placed in the radio base station 15 in which the mobile terminal 32 communicated before making a move:

(a) the foreign agent is relocated in the radio base station 13, in which case, the foreign agent function of the mobile terminal 32 is generated in the radio base station 13 by following the same procedure as with steps S106 to S108 in FIG. 3 and the foreign agent function of the mobile terminal 32 that has been placed in the radio base station 15 is canceled, and accordingly, for example, when the mobile terminal 32 moves from the radio base station 15 to the radio base station 13 while having a session with the communication party 22, the route for communicating packets between the mobile terminal 32 and communication party 22 is changed from one by way of the radio base station 15 (mobile terminal 32←→radio base station 15←→second node 18) to one by way of the radio base station 13 (mobile terminal 32←→radio base station 13←→second node 18); or (b) the foreign agent is relocated in the first node 16 supporting the radio base station 13 in which the mobile terminal 32 communicates after making a move, in which case, the foreign agent function of the mobile terminal 32 is generated in the first node 16 by following the same procedure as with steps S206 to S208 in FIG. 4 and the foreign agent function of the mobile terminal 32 that has been placed in the radio base station 15 is canceled, and accordingly, for example, when the mobile terminal 32 moves from the radio base station 15 to the radio base station 13 while having a session with the communication party 22, the route for communicating packets between the mobile terminal 32 and communication party 22 is changed from one by way of the radio base station 15 (mobile terminal 32←→radio base station 15←→second node 18) to one by way of the radio base station 13 and the first node 16 (mobile terminal 32←→radio base station 13←→first node 16←→second node 18).

(B) When the foreign agent has been placed in the first node 17 which supports the radio base station 15 in which the mobile terminal 32 communicated before making a move:

(a) the foreign agent is relocated in the radio base station 13, in which case, the foreign agent function of the mobile terminal 32 is generated in the radio base station 13 by following the same procedure as with steps S106 to S108 in FIG. 3 and the foreign agent function of the mobile terminal 32 that has been placed in the first node 17 is canceled, and accordingly, for example, when the mobile terminal 32 moves from the radio base station 15 to the radio base station 13 while having a session with the communication party 22, the route for communicating packets between the mobile terminal 32 and communication party 22 is changed from one by way of the radio base station 15 and the first node 17 (mobile terminal 32←→radio base station 15←→first node 17←→second node 18) to one by way of the radio base station 13 (mobile terminal 32←→radio base station 13←→second node 18); or (b) the foreign agent is relocated in the first node 16 supporting the radio base station 13 in which the mobile terminal 32 communicates after making a move, in which case, the foreign agent function of the mobile terminal 32 is generated in the first node 16 by following the same procedure as with steps S206 to S208 in FIG. 4 and the foreign agent function of the mobile terminal 32 that has been placed in the first node 17 is canceled, and accordingly, for example, when the mobile terminal 32 moves from the radio base station 15 to the radio base station 13 while having a session with the communication party 22, the route for communicating packets between the mobile terminal 32 and communication party 22 is changed from one by way of the radio base station 15 and the first node 17 (mobile terminal 32←→radio base station 15←→first node 17 ←→second node 18) to one by way of the radio base station 13 and the first node 16 (mobile terminal 32←→radio base station 13←→first node 16←→second node 18).

Second Embodiment

While a preferred embodiment of the present invention has been described, it is not so limited but is susceptible of various changes and modifications. In the following, a description will be given of the second embodiment of the present invention.

While in the first embodiment, the movement/mobility characteristic of the mobile terminal is monitored and the location of the foreign agent is determined based on the monitoring result, the location may be determined based on: (1) the frequency of foreign agent switching per unit of time on each mobile terminal; (2) the model type of each mobile terminal; and/or (3) the availability/use of resources in the packet network of the mobile communication, instead of the movement/mobility characteristic.

In the case of (1), it is necessary to keep track of the frequency of foreign agent switching per unit of time for each mobile terminal instead of the movement/mobility characteristic data 1092 shown in FIG. 2. When the frequency is less than a prescribed threshold, the foreign agent is placed in the radio base station in the area where the mobile terminal has moved. Otherwise, the foreign agent is placed in the first node supporting the radio base station in the area where the mobile terminal has moved.

In the case of (2), the model type of the mobile terminal is set instead of the movement/mobility characteristic data 1092 shown in FIG. 2. The model type indicates that the mobile terminal is a PHS, a cellular phone or the like. Since the frequency of movement is statically predictable to a certain extent according to the model type, for the type of mobile terminal that makes a small number of moves, the foreign agent is placed in the radio base station in the area where the mobile terminal has moved. Otherwise, the foreign agent is placed in the first node supporting the radio base station in the area where the mobile terminal has moved.

In the case of (3), the monitor 19 is replaced by a monitor which monitors the use of resources in the packet network such as paths linking the first nodes with the second node. The second node finds out the amount of used resources (usage rate of CPU, memory, etc.) in the first node supporting the radio base station in the area where the mobile terminal has moved and free bands for a path between the first node and second node from the monitored information when the mobile terminal requests Mobile IP registration, and determines to place the foreign agent in the first node if the first node has enough resources. Otherwise, the foreign agent is placed in the radio base station in the area where the mobile terminal has moved.

Besides, in the first embodiment, the decision about whether to place the foreign agent of each mobile terminal in the first node or in the radio base station is made on the occasion of registering the location of each mobile terminal, and the foreign agent is fixedly placed in the determined position until the next position registration takes place. However, the location of the foreign agent may be changed before the next position registration. A change in the location of the foreign agent may be made during a session between the mobile terminal and communication party as with the case of the first embodiment. For example, the location of the foreign agent for each mobile terminal may be changed: (4) based on the availability/use of resources in the packet network of the mobile communication network; and/or (5) in response to a delay request from the user application of the mobile terminal.

In the case of (4), the monitor 19 is replaced by a monitor which monitors the use of resources in the packet network such as paths linking the first nodes with the second node. The second node finds out the amount of used resources (usage rate of CPU, memory, etc.) in the first node and free bands for a path between the first node and second node from the monitored information, and when judging that the first node does not have enough resources, moves a part of or all the foreign agent functions of the mobile terminals placed in the first node to the radio base stations where the mobile terminals are linked. On the other hand, if the first node has enough resources, the second node moves a part of or all the foreign agent functions of the mobile terminals placed in the radio base stations belonging to the first node to the first node.

Considering the case where the mobile terminal moves while having a session and communicating with the communication party, the frequency of foreign agent switching varies depending on whether the foreign agent is placed in the radio base station or in the first node. It would be a disadvantage in transmitting packets of voice signals that allow little delay if the location of the foreign agent is frequently changed since the changes delay the transmission of packets. On the other hand, a certain delay is not a problem when transmitting packets of text or characters. In the case of (5), the location of the foreign agent of the mobile terminal is changed in response to a delay request of the user application of the mobile terminal. For example, when the mobile terminal informs the second node as to the necessity of communication with little delay and its foreign agent has been placed in the radio base station, the second node moves the foreign agent of the mobile terminal to the first node supporting the radio base station. On the contrary, when the mobile terminal informs the second node that communication allows some delay, the second node moves the foreign agent of the mobile terminal to the radio base station utilized by the mobile terminal if it has been placed in the first node.

Third Embodiment

FIG. 10 is a diagram showing the configuration of a system according to the third embodiment of the present invention. The system is an improvement on its predecessors using a network with the Mobile IPv6 as a base, and comprises a plurality of subnetworks, links 201 to 203, which are interconnected with each other through an IP core network 200 such as the Internet. In FIG. 10, while only one mobile terminal 204 and one communication party 205 are shown for convenience of explanation, one or more mobile terminals can be connected to each of the links 201 to 203. As to the home agent, only one home agent 206 of the mobile terminal 204 is shown in the drawing. The position/location indicated by a broken line on the link 201 is the home location of the mobile terminal 204. That is, for the mobile terminal 204, the link 201 is a home link, and the links 202 and 203 are foreign links. Referring to FIG. 10, the mobile terminal 204 is linked with the foreign link 203. Examples of the communication party of the mobile terminal 204 include fixed terminals such as personal computers in addition to other mobile terminals. In FIG. 10, a communication party 207 is shown as a fixed terminal that communicates with the mobile terminal 204. Incidentally, the relationship between the home agent 206 and mobile terminal 204 in the system of FIG. 10 corresponds to the relationship between GGSN (Gateway GPRS Support Node) and a mobile terminal in a 3G mobile network.

The mobile terminal 204 is provided with a function for storing and managing the communication party list and a function for sending a binding update request to the home agent 206 to report a new c/o address with the communication party list when the connected link has changed in addition to the same function as provided to the mobile terminal with the Mobile IPv6. The communication party list contains a home address of each communication party as shown in FIG. 11.

The home agent 206 is provided with a function for sending the binding update request to report the new c/o address of the mobile terminal 204 to each of the communication parties in the communication party list when receiving the binding update request from the mobile terminal 204 in addition to the same function as provided to the home agent with the Mobile IPv6.

Figure 12:
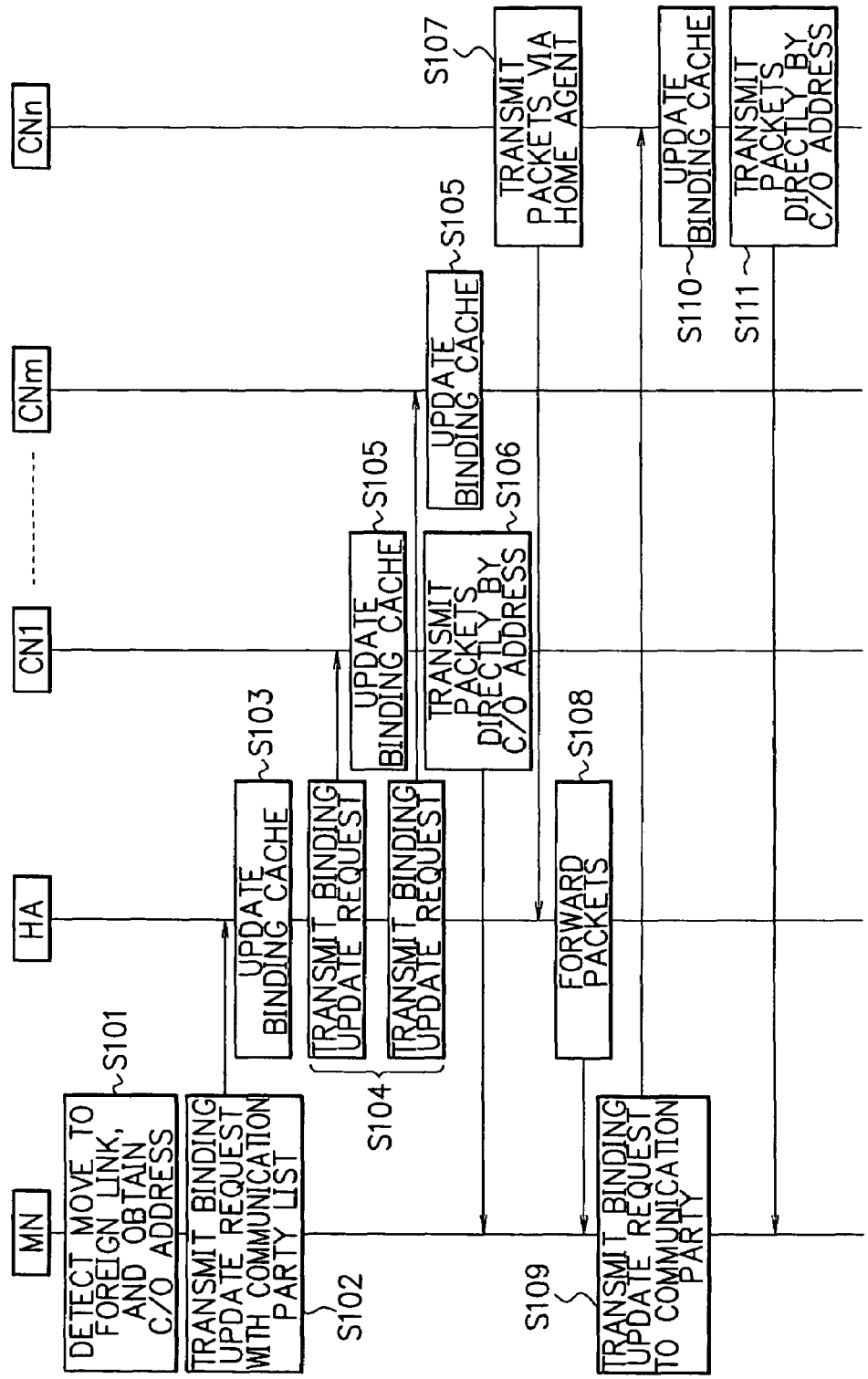
FIG. 12 is a sequence diagram showing process according to an embodiment of the present invention.
Figure 13:
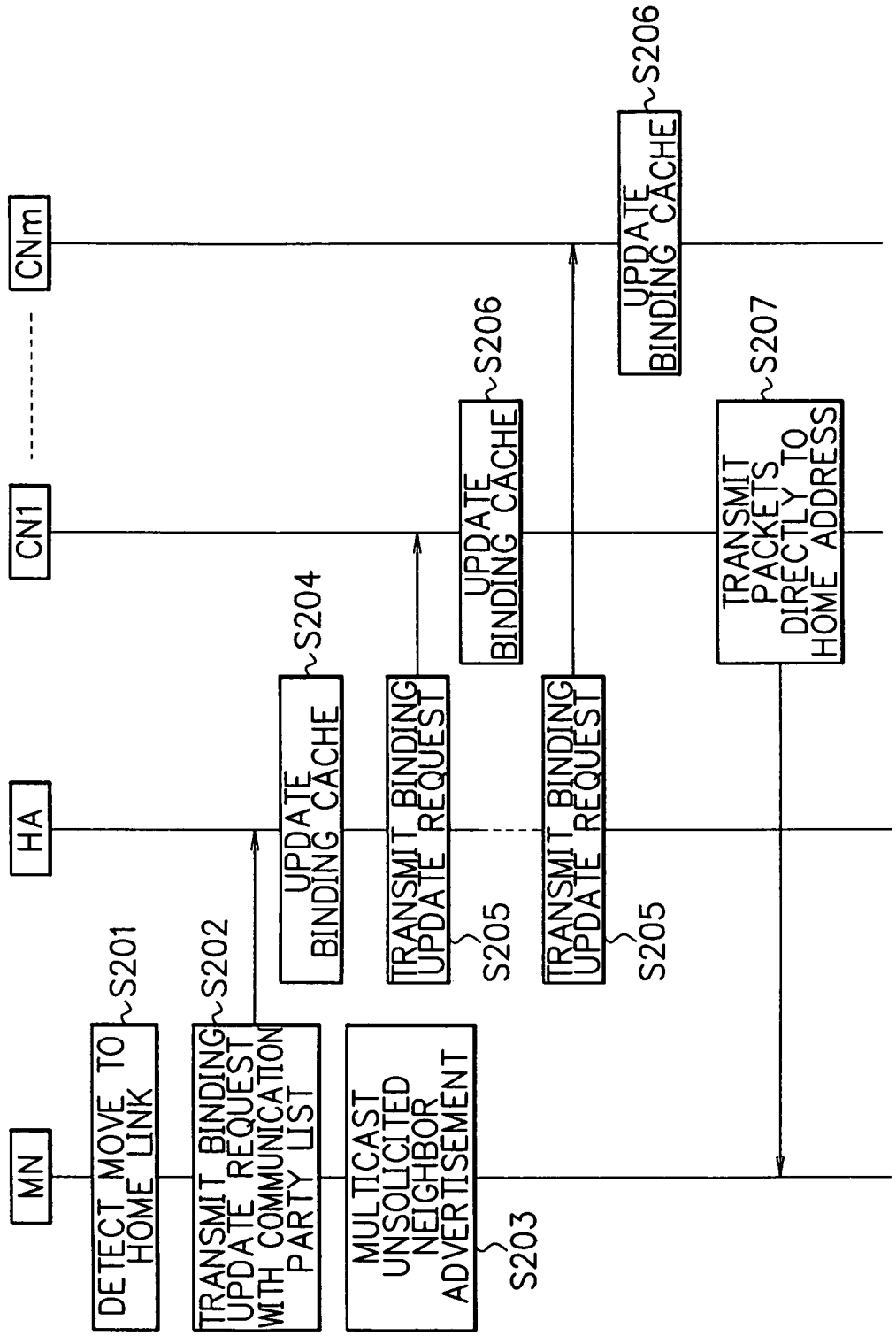
FIG. 13 is a sequence diagram showing process according to an embodiment of the present invention.

FIGS. 12 and 13 are sequence diagrams showing processes performed by the mobile terminal, home agent and communication party according to the third embodiment of the present invention. These processes are executed by computers under the control of programs stored in memories included in the mobile terminal, home agent and communication terminal. In the following, the operation of this embodiment will be explained with reference to the respective drawings.

(1) In the case where the mobile terminal 204 moves to the foreign link

When having moved from the home link 201 to the foreign link 202 or 203, or from one foreign link to another, the mobile terminal 204 detects a move to the foreign link by a router advertisement as with the mobile terminal using the Mobile IPv6, and obtains a new c/o address (S101 in FIG. 12). The c/o address can be obtained by the stateful address auto configuration or the stateless address auto configuration according to DHCP (Dynamic Host Configuration Protocol) v6 (RFC 1971). The new c/o address obtained by the mobile terminal 204 is denoted by X:a. X:a indicates an IPv6 address of 128 bits in length, in which X indicates a network prefix of the newly connected link, and a indicates an interface ID of the mobile terminal 204.

Subsequently, the mobile terminal 204 sends the obtained c/o address with the communication party list as shown in FIG. 11 as a binding update request to the home agent 206 (S102). FIG. 14(a) is a diagram showing an example of the format of a packet for the binding update request sent from the mobile terminal 204 to the home agent 206. The IPv6 header contains the c/o address as a source address (SA) and the address of the home agent 206 as a destination address (DA), and the home address of the mobile terminal 204 and the communication party list are attached thereto.

Having received the binding update request from the mobile terminal 204, the home agent 206 updates its binding cache, and registers a pair of the notified c/o address and the home address of the mobile terminal 204 (S103). After that, the home agent 206 repeatedly sends the binding update request specifying the c/o address notified by the mobile terminal 204 to the respective communication parties included in the communication party list attached to the binding update request (S104). In an example of the communication party list shown in FIG. 11, the binding update request is sent to m communication parties CN1 to CNm. FIG. 14(b) is a diagram showing an example of the format of a packet for the binding update request sent from the home agent 206 to the communication parties. The IPv6 header contains the c/o address of the mobile terminal 204 as a source address (SA) and the home address of each communication party as a destination address (DA), and the home address of the mobile terminal 204 is attached thereto.

Each of the communication parties CN1 to CNm, which has received the binding update request, updates its binding cache, and registers a pair of the notified c/o address and home address of the mobile terminal 204 (S105).

Incidentally, the binding update option in the Mobile IPv6 can be used as the binding update request sent from the home agent 206 to the communication parties. Besides, the binding update request sent from the mobile terminal 204 to the home agent 206 can be realized by adding the communication party list to the binding update option in the Mobile IPv6.

(2) The transmission of packets to the mobile terminal 204

In the case where the communication party sends packets to the mobile terminal 204, the upper layer protocol and application of the communication party use the home address as the address of the mobile terminal 204. A packet in which the home address of the mobile terminal 204 is designated as a receiver is treated differently depending on whether or not the c/o address corresponding to the home address is present in the binding cache of the communication party. When the c/o address of the mobile terminal 204 is present in the binding cache as in the case of the communication parties CN1 to CNm shown in FIG. 12, direct transmission is started right from the first packet based on the c/o address (S106). On the other hand, when the c/o address of the mobile terminal 204 is not present in the binding cache as in the case of the communication party CNn in FIG. 12, the first packet is transmitted via the home agent 206 (S107, S108), and when the mobile terminal 204 sends the binding update request reporting its c/o address to the communication party CNn (S109), the communication party CNn updates the binding cache (S110), thereby starting direct transmission from the second packet based on the c/o address (S111).

In the following, both processes will be explained by taking the case where the communication party 205 transmits packets to the mobile terminal 204 in FIG. 10 for example. In the following description, the home address of the mobile terminal 204 is denoted by Xh, the home address of the communication party is denoted by Y, and the address of the home agent 206 is denoted by H.

Figure 15:
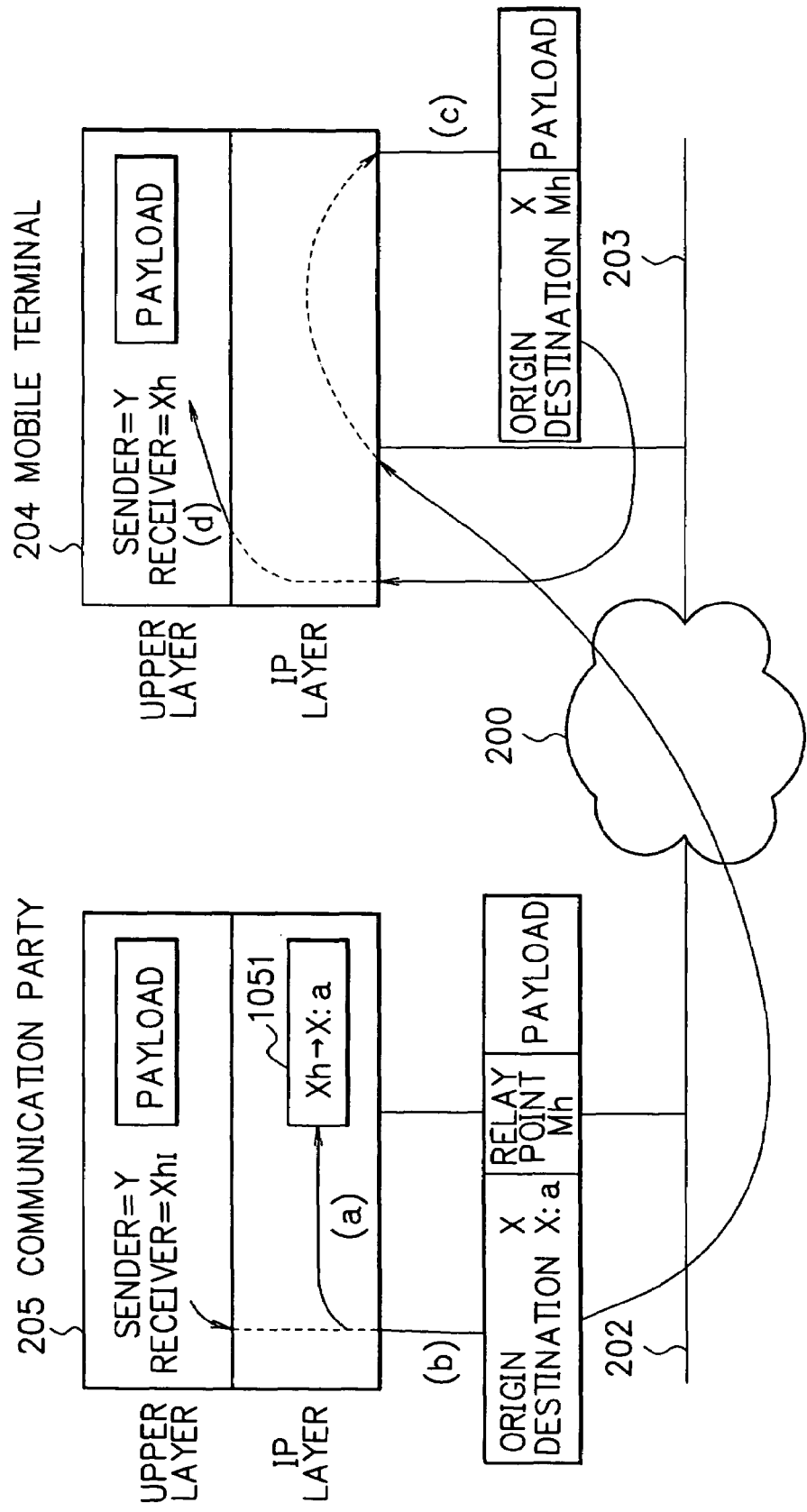
FIG. 15 is a diagram illustrating process on the occasion when the communication party which knows the c/o address of the mobile terminal transmits packets to the mobile terminal.

(2-1) In the case where the c/o address of the mobile terminal 204 is present in the binding cache (See FIG. 15)

Having received a packet in which the home address Xh of the mobile terminal 204 is designated as a receiver from an upper layer, the IP layer of the communication party 205 searches the binding cache 1051 with the home address Xh, and obtains the c/o address X:a ((a) in FIG. 15). Subsequently, the IP layer corrects the destination address to the c/o address X:a, sets the home address Xh of the mobile terminal 204 as a relay point in the path control header, and transmits the packet ((b)). Having received the packet, the mobile terminal 204 processes the path control header ((c)), and thereby its home address is set as a receiver. Thus, the mobile terminal 204 recognizes that the packet is addressed to the mobile terminal 204 and receives the packet ((d)).

Figure 16:
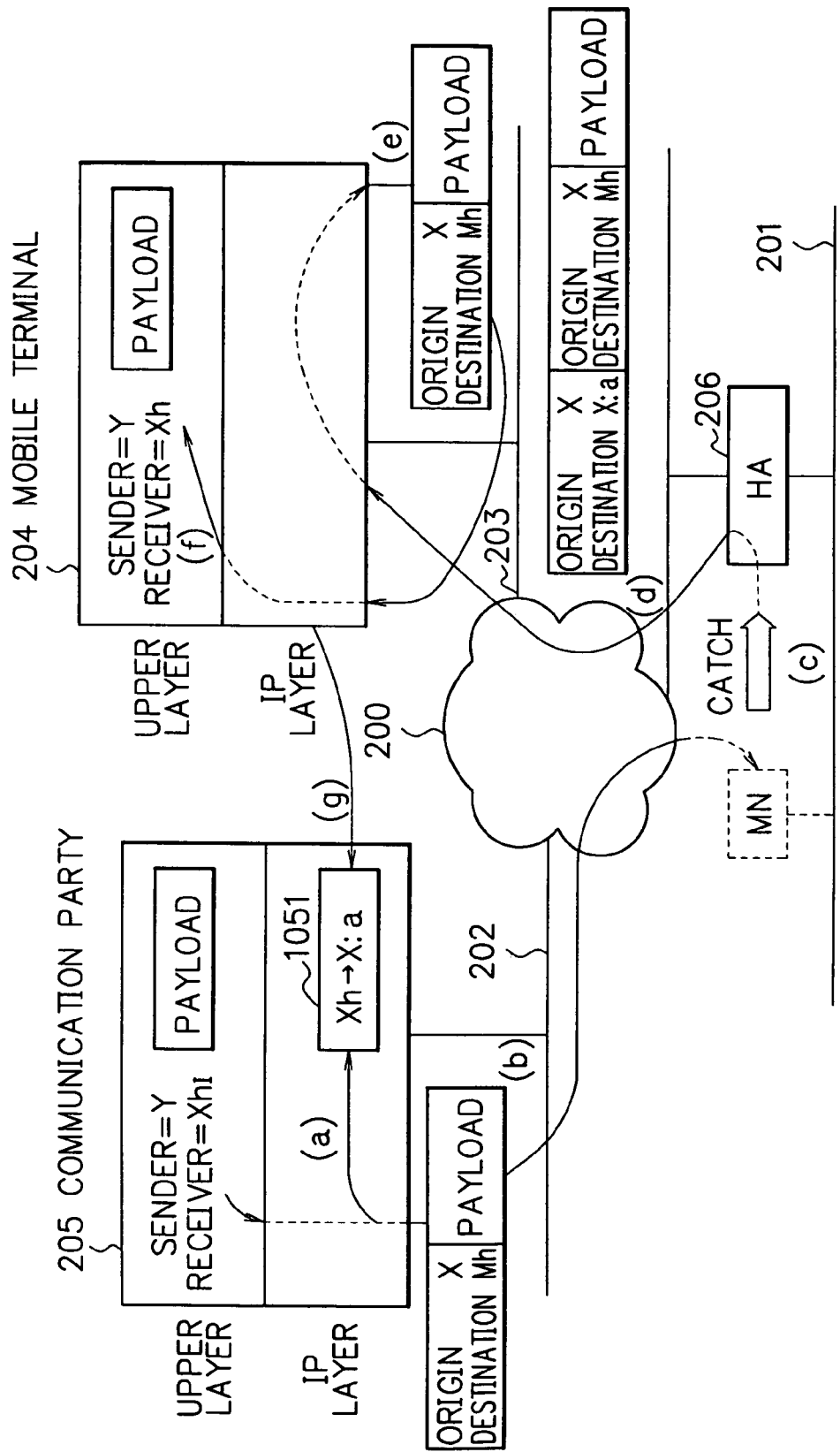
FIG. 16 is a diagram illustrating process on the occasion when the communication party which does not know the c/o address of the mobile terminal transmits packets to the mobile terminal.

(2-2) In the case where the c/o address of the mobile terminal 204 is not present in the binding cache (See FIG. 16)

Having received a packet in which the home address Xh of the mobile terminal 204 is designated as a receiver from an upper layer, the IP layer of the communication party 205 searches the binding cache 1051 with the home address Xh ((a) in FIG. 16). Since the c/o address of the mobile terminal 204 is not present in the binding cache 1051, the IP layer leaves the home address Xh set as a receiver, and transmits the packet ((b)). The packet is caught by the home agent 206 ((c)). The home agent 206 obtains the c/o address X:a of the mobile terminal 204 from its binding cache (not shown), adds an IPv6 header (tunneling header), which contains the address H of the home agent as a source address and the c/o address X:a of the mobile terminal 204 as a destination address, to the top of the obtained packet, and transmits the packet ((d)). That is, the packet is sent to the c/o address of the mobile terminal 204 by tunneling. After the tunneling header is eliminated from the packet ((e)), the packet is processed as an ordinal IPv6 packet ((f)). Besides, the mobile terminal 204 transmits the binding update option to the communication party 205 ((g)) so as to register a pair of the home address Xh and c/o address X:a of the mobile terminal 204 in the binding cache 1051. After that, the communication party 205 transmits packets directly to the c/o address X:a of the mobile terminal 204.

(3) The transmission of packets from the mobile terminal 204

In the case where the mobile terminal 204 sends packets to the communication party, the upper layer uses the home address Xh as a source address. The IP layer stores the source address Xh of the packet in a home address option, switches the source address to the c/o address X:a, and transmits the packet. The IP layer of the communication party which has received the packet operates contrary to this. That is, the IP layer obtains the home address Xh of the mobile terminal 204 from the home address option of the packet, replaces the source address X:a with the home address, and passes the packet to the upper layer.

(4) When the mobile terminal 204 returns to the home link (See FIG. 13)

When the mobile terminal 204 recognizes that it has returned to the home link in the same manner as described previously for (1) (S201 in FIG. 13), the mobile terminal 204 sends a binding update request in the format as shown in FIG. 14(a) with the communication party list as shown in FIG. 11 to the home agent 206 (S202). Incidentally, the home address Xh is put in the place of the c/o address X:a in FIG. 14(a). Besides, the mobile terminal 204 multicasts an unsolicited neighbor advertisement to all the nodes in the home link so as to receive the packets sent to its home address Xh (S203).

Having received the binding update request from the mobile terminal 204 that has returned to the home link, the home agent 206 updates its binding cache, and registers the presence of the mobile terminal 204 in the home link (S204). Subsequently, the home agent 206 repeatedly sends the binding update request as shown in FIG. 14(b) to report that the mobile terminal 204 has returned to the home link to the respective communication parties included in the communication party list attached to the binding update request (S205). Incidentally, the home address Xh is put in the place of the c/o address X:a in FIG. 14(b). After that, the home agent 206 terminates packet capture and packet forwarding service.

Each of the communication parties CN1 to CNm, which has received the binding update request from the home agent 206 deletes a pair of the c/o address and home address of the mobile terminal 204 from its binding cache (S206). After that, the communication parties CN1 to CNm transmit packets directly to the home address of the mobile terminal 204 when transmitting the packets thereto (S207).

As set forth hereinabove, in accordance with the third embodiment of the present invention, a plurality of communication parties are notified of the latest c/o address of the mobile terminal 204 when the connected link of the mobile terminal 204 has changed. Consequently, the communication parties which have been notified of the c/o address can transmit packets directly to the c/o address of the mobile terminal 204 right from the first packet. Thereby, it is possible to reduce overhead due to transmissions through the home agent. Moreover, even in the case where many communication parties start transmitting packets to the same mobile terminal or plural mobile terminals whose home agents are placed in the same node all at once, it is possible to prevent the concentration of loads on the home agent and relevant nodes. As for the process in the mobile terminal 204, the mobile terminal 204 is only required to send the binding update request with the communication party list to the home agent 206, and the home agent 206 is deputed to transmit the binding update request to the respective communication parties on the communication party list. Thus, the load on the mobile terminal 204 can be reduced.

Next, a description will be given of a function for storing/managing the communication party list provided to the mobile terminal 204. The list of all the communication parties to/from which the mobile terminal 204 has sent/received packets may be maintained if there are no restrictions on the memory capacity for storing the communication party list, the communication costs for transmitting the list and the like. In the following, however, a description will be made as an example of the case where the upper limit (n) is set on the number of communication parties in the list to store and manage the list of n communication parties to/from which the mobile terminal 204 has most frequently sent/received packets.

Figure 17:
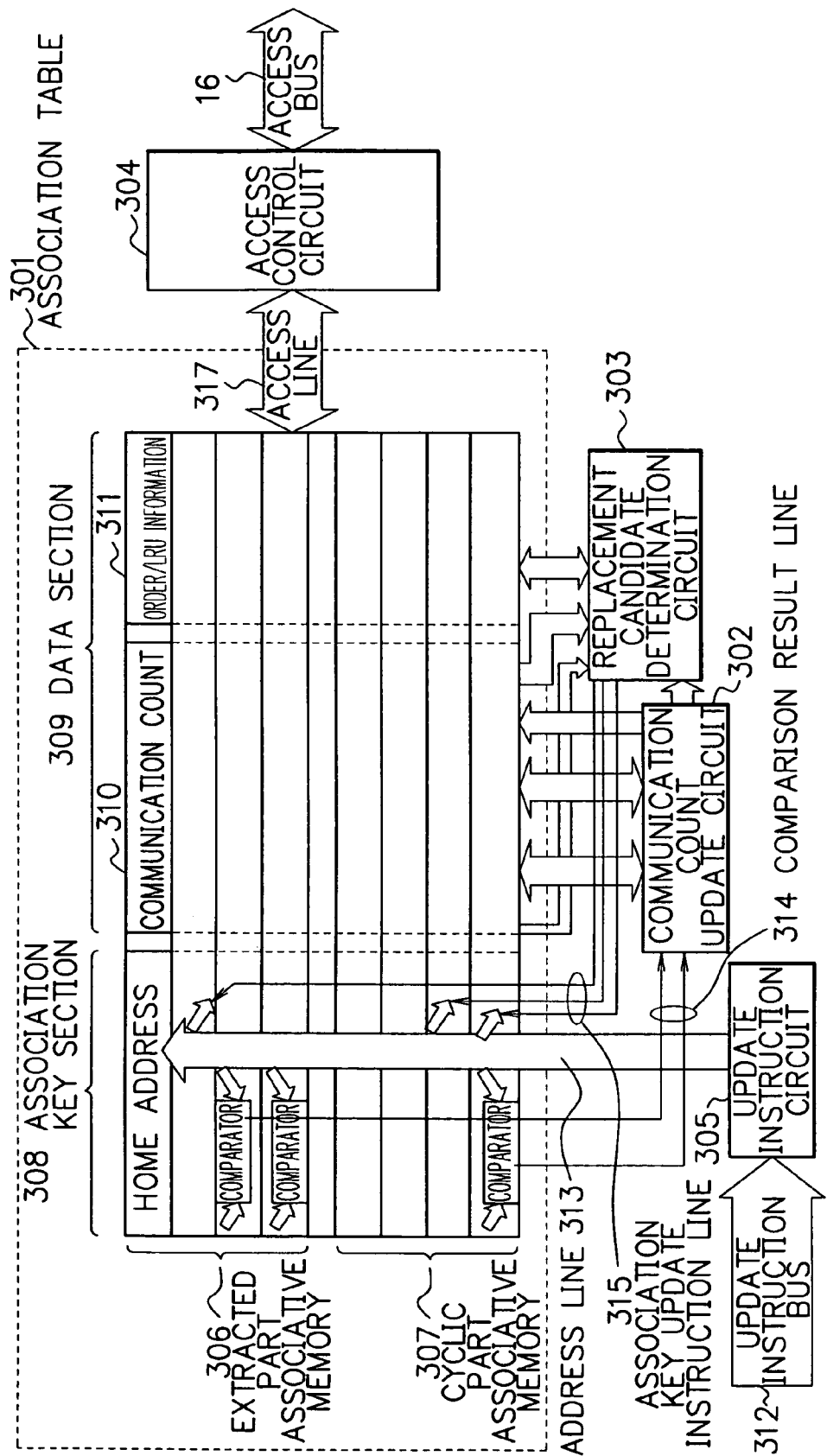
FIG. 17 is a block diagram showing a communication party list storing/managing mechanism provided to the mobile terminal.

FIG. 17 is a block diagram showing a communication party list storing/managing mechanism provided to the mobile terminal 204. The communication party list storing/managing mechanism comprises an association table 301, a communication count update circuit 302, a replacement candidate determination circuit 303, an access control circuit 304 and an update instruction circuit 305.

The association table 301 is a full associative memory having n+m entries, in which successive n entries constitute an extracted part associative memory 306 and remaining m entries constitutes a cyclic part associative memory 307. In the last result, the extracted part associative memory 306 stores the list of n most communicated communication parties. The cyclic part associative memory 307 is used for temporarily storing the list of communication parties which do not rank among the n most communicated communication parties.

Each entry of the association table 301 is composed of an association key section 308 and a data section 309, and further, the data section 309 is separated into a communication count section 310 and an order/LRU information section 311. The association key section 308 has a register of the home addresses of communication parties, the communication count section 310 has a register of communication counts, and the order/LRU information section 311 of the extracted part associative memory 306 has a register of order information. In other words, respective entries in the extracted part associative memory 306 are logically listed in order of communication count as shown in FIG. 18 according to the order information registered in the order/LRU information section 311. Incidentally, in FIG. 18, the numeral 401 represents a pointer for indicating an entry with the least communication count (least communication count entry 400) of n entries, and is provided in the replacement candidate determination circuit 303.

Besides, the order/LRU information section 311 of the cyclic part associative memory 307 has a register of LRU information, and the least recently referenced entry is replaced according to the LRU algorithm (least recently used algorithm). That is, m entries in the cyclic part associative memory 307 are logically listed in order of recency of reference as shown in FIG. 18. The replacement candidate determination circuit 303 provided with a pointer 403 indicating the least recently referenced entry 402 decides on an entry to be purged from the cyclic part associative memory 307 by using the pointer 403 according to the LRU rule.

The update instruction circuit 305 is connected with MPU (not shown) included in the mobile terminal 204 via an update instruction bus 312. When the update instruction circuit 305 is notified of the home address of a communication party to/from which the mobile terminal 204 has sent/received packets by a communication application program executed on the MPU via the update instruction bus 312, the update instruction circuit 305 outputs the home address to an address line 313 as well as communicating it to the communication count update circuit 302. The address line 313 is connected with the association key sections 308 of respective entries in the association table 301. A comparator in each association key section 308 compares the home address registered in the association key section 308 with that on the address line 313, and a comparison result is communicated to the communication count update circuit 302 through each comparison result line 314.

The communication count update circuit 302 is a circuit for updating the communication count sections 310 of respective entries in the association table 301. When a match between the two home addresses is reported for an entry through the comparison result line 314, the communication count update circuit 302 updates the entry by incrementing the communication count thereof by 1. After that, the communication count update circuit 302 specifies the updated entry, and activates the replacement candidate determination circuit 303. When no comparison result line 314 reports a match for any entry, namely, when the home address output to the address line 313 is unregistered in the association table 301, the communication count update circuit 302 requests the replacement candidate determination circuit 303 to reserve the entry in the cyclic part associative memory 307, and initializes the communication count of the reserved entry to 1.

When activated by the communication count update circuit 302, the replacement candidate determination circuit 303 operates as follows.

(1) In the case where the updated entry is in the extracted part associative memory 306, as described previously in connection with FIG. 18, the replacement candidate determination circuit 303 updates the order information registered in the order/LRU information section 311 and the pointer 401 if necessary so that n entries in the extracted part associative memory 306 are logically listed in order of the communication count.

(2) In the case where the updated entry is in the cyclic part associative memory 307, the replacement candidate determination circuit 303 compares the communication count of the entry with the communication count of the entry 400 indicated by the pointer 401 shown in FIG. 18 in the extracted part associative memory 306, and replaces the content of the entry 400 in the extracted part associative memory 306 with the content of the updated entry when the communication count of the updated entry is higher than that of the entry 400.

On the other hand, when receiving an entry reserve request from the communication count update circuit 302, the replacement candidate determination circuit 303 decides to purge the entry 402 indicated by the pointer 403 shown in FIG. 18 from among m entries in the cyclic part associative memory 307. In addition, the replacement candidate determination circuit 303 registers the home address in the association key section 308 of the entry 402 through an association key update instruction line 315, and notifies the communication count update circuit 302 about the entry 402.

The access control circuit 304 is connected to the MPU via an access bus 316, and also connected to the extracted part associative memory 306 in the association table 301 via an access line 317 including a data line and address line so as to read the contents of respective entries out of the extracted part associative memory 306 in the association table 301 according to the addressing by the MPU. In the contents, n home addresses registered in the association key sections 308 forms the list of n communication parties with which the mobile terminal communicates most frequently.

The case of storing and managing the list of n communication parties to/from which the mobile terminal has most frequently sent/received packets has been explained as an example in connection with FIG. 17. However, the communication application program may notify the update instruction circuit 305 of only the home addresses of communication parties from which the mobile terminal 204 has received packets via the update instruction bus 312 without reporting the home addresses of communication parties to which the mobile terminal 204 has sent packets so that the list of n communication parties from which the mobile terminal has most frequently received packets is stored and managed.

While the above-mentioned communication party list storing/managing mechanism is implemented in hardware, it can be implemented in software. In that case, the mobile terminal stores a program dedicated to the mechanism in its memory. The program stored in the memory is read by the computer constituting the mobile terminal, and implements functions corresponding to the association table 301, the communication count update circuit 302, the replacement candidate determination circuit 303, the access control circuit 304 and the update instruction circuit 305 on the computer.

While the present invention is applied to a network using the Mobile IPv6 in the above-described embodiments, the invention is applicable to a network using the Mobile IPv4. In that case, the mobile terminal notifies the home agent of a new c/o address and a communication party list through the foreign agent when it moves to another link to be connected. Then, the home agent may notify respective communication parties in the communication party list about a pair of the home address and c/o address of the mobile terminal, or the foreign agent may notify respective communication parties in the communication party list about the pair of the home address and c/o address of the mobile terminal as well as notifying the home agent about the pair as in the case of the Mobile IPv6. Each of the communication parties stores the pair of the home address and c/o address of the mobile terminal in its memory and, when transmitting packets to the mobile terminal, searches the memory for the c/o address based on the home address. If there is the relevant c/o address, the communication party transmits packets directly to the c/o address.

Additionally, in the aforementioned embodiments, the agent is deputed to report a pair of the latest c/o address and home address of the mobile terminal to respective communication parties in the communication party list. However, the report may be made by the mobile terminal itself.

INDUSTRIAL APPLICABILITY

As set forth hereinabove, in accordance with the present invention, it is possible to prevent the concentration of loads on the node that serves as the foreign agent for the mobile terminals. This is because the foreign agent functions of the plural mobile terminals are distributed to the first node and respective radio base stations belonging to the first node.

Moreover, in accordance with the present invention, it is possible to restrain delays in the transmission and reception of packets between the mobile terminal and its communication party. This is because, when the foreign agent of the mobile terminal is placed in the radio base station, packets can be transmitted and received without the intervention of the first node.

As is described above, in accordance with the present invention, the first packet addressed to the mobile terminal can be transmitted directly from the communication party. This is because, when connected subnetwork has changed, a certain number of communication parties which, for example, have most frequently communicated with the mobile terminal are notified of a pair of the latest c/o address and home address of the mobile terminal so that the communication parties can transmit packets directly to the c/o address right from the first packet.

Furthermore, in accordance with the present invention, it is possible to reduce the load on the mobile terminal which is to notify plural communication parties of the c/o address in advance. This is because the mobile terminal transmits a binding update request to which the communication party list is attached to the agent so that the agent carries out the transmission of the binding update request to respective communication parties in the communication party list for the mobile terminal.

The invention claimed is:

1. A mobile terminal management system comprising:
a first node which supports at least a first radio base station, and sets and manages a radio access link with a plurality of mobile terminals connected through the first radio base station; and
a second node which provides a gateway router function for connecting to Internet Protocol (IP) core network and a home agent function of a mobile terminal of the plurality of mobile terminals;
wherein:
a foreign agent function for a first mobile terminal of the plurality of mobile terminals is placed in the first radio base station which the first mobile terminal is currently utilizing, and
a foreign agent function for a second mobile terminal of the plurality of mobile terminals is placed in the first node;
the mobile terminal management system, further comprising a means for deciding whether the foreign agent function of each of the plurality of mobile terminals is placed in the first radio base station or in the first node when registering the location of the mobile terminal.

2. The mobile terminal management system claimed in claim 1, further comprising a means for changing the location of the foreign agent of said each mobile terminal during a session between said each mobile terminal and its communication party.

3. The mobile terminal management system claimed in claim 1 or 2, further comprising a means for deciding whether the foreign agent function of each of the plurality of mobile terminals is placed in the first radio base station or in the first node on the basis of information set in the subscriber data of the mobile terminal.

4. The mobile terminal management system claimed in claim 1 or 2, further comprising a means for deciding whether the foreign agent function of each of the plurality of mobile terminals is placed in the first radio base station or in the first node based on the movement/mobility characteristic of the mobile terminal.

5. The mobile terminal management system claimed in claim 1 or 2, further comprising a means for deciding whether the foreign agent functions of each of the plurality of mobile terminals is placed in the radio base station or in the first node based on the frequency of foreign agent switching per unit of time on the mobile terminal.

6. The mobile terminal management system claimed in claim 1 or 2, further comprising a means for deciding whether the foreign agent function of each of the plurality of mobile terminals is placed in the first radio base station or in the first node based on the model type of the mobile terminal.

7. The mobile terminal management system claimed in claim 1 or 2, further comprising a means for deciding whether the foreign agent function of each of the plurality of mobile terminals is placed in the first radio base station or in the first node based on the availability/use of resources in the packet network of the mobile communication network.

8. The mobile terminal management system claimed in claim 1, further comprising a means for changing the location of the foreign agent for the mobile terminal before the next location registration request.

9. The mobile terminal management system claimed in claim 8, further comprising a means for changing the location of the foreign agent for the mobile terminal during a session between the mobile terminal and its communication party.

10. The mobile terminal management system claimed in claim 8, wherein the location of the foreign agent of the mobile terminal is changed based on the availability/use of resources in the packet network of the mobile communication network.

11. The mobile terminal management system claimed in claim 8, wherein the location of the foreign agent of the mobile terminal is changed in response to a delay request of the user application of the mobile terminal.

12. A mobile terminal management system comprising:
a network that includes a plurality of subnetworks interconnected with each other; and
a plurality of mobile terminals, each having a Care-Of (C/O) address depending on a subnetwork to which the mobile terminal is currently connected and a home address which is independent of the subnetwork, wherein:
in response to the subnetwork connected to a mobile terminal changing, a plurality of communication parties are notified of a pair of the latest C/O address and home address of the mobile terminal;
the mobile terminal management system, further comprising a means for deciding whether a foreign agent function of each of the plurality of mobile terminals is placed in a first radio base station or in a first node when registering the location of the mobile terminal.

13. The mobile terminal management system claimed in claim 12, wherein the mobile terminal is provided with a means for storing and managing a communication party list, a means for transmitting a binding update request to report the new C/O address with the communication party list when the connected subnetwork has changed, and an agent for receiving the binding update request and notifying the respective communication parties in the communication party list of the pair of the latest C/O address and home address.

14. The mobile terminal management system claimed in claim 13, wherein the means for storing and managing the communication party list includes a means for creating a list of a fixed number of the most communicated communication parties by monitoring communications on the mobile terminal.

15. The mobile terminal management system claimed in claim 13 or 14, wherein the network is a network based on the Mobile Internet Protocol (IP)v6, and the agent is the home agent of the mobile terminal.

16. The mobile terminal management system claimed in claim 13 or 14, wherein the network is a network based on the Mobile Internet Protocol (IP)v4, and the agent is the home agent of the mobile terminal.

17. The mobile terminal management system claimed in claim 13 or 14, wherein the network is a network based on the Mobile Internet Protocol (IP)v4, and the agent is the foreign agent of the mobile terminal.

18. A mobile terminal having a Care-Of (C/O) address depending on a subnetwork to which the mobile terminal is currently connected and a home address which is independent of the subnetwork, comprising:
means for storing and managing a communication party list; and
means for transmitting a binding update request to report a new C/O address with the communication party list attached to the binding update request, in response to a change in the subnetwork to which the mobile terminal is connected;

wherein the subnetwork to which the mobile terminal is connected is comprised by a network comprising a means for deciding whether a foreign agent function of each of a plurality of mobile terminals is placed in a first radio base station or in a first node when registering the location of the mobile terminal.

19. The mobile terminal management system claimed in claim 18, wherein the means for storing and managing the communication party list includes a means for creating a list of a fixed number of the most communicated communication parties by monitoring communications on the mobile terminal.

20. An agent in a network that includes a plurality of subnetworks interconnected with each other and that includes mobile terminals each having a Care-Of (C/O) address depending on a subnetwork to which the mobile terminal is currently being connected and a home address that is independent of the subnetwork, comprising:

means for receiving a binding update request sent from each mobile terminal when the subnetwork connected to the mobile terminal has changed; and means for notifying respective communication parties in a communication party list attached to the received binding update request about a pair of the latest C/O address and home address of the mobile terminal;

wherein the network comprises a means for deciding whether a foreign agent function of each of a plurality of mobile terminals is placed in a first radio base station or in a first node when registering the location of the mobile terminal.

21. A computer-readable storage medium storing instructions for enabling a computer constituting a mobile terminal having a Care-Of (C/O) address depending on a subnetwork to which the mobile terminal is currently connected and a home address which is independent of the subnetwork, to function as:

means for storing and managing a communication party list; and means for transmitting a binding update request to report a new C/O address with the communication party list in response to a change in the subnetwork to which the mobile terminal is connected;

wherein the subnetwork to which the mobile terminal is connected is comprised by a network comprising a means for deciding whether a foreign agent function of each of a plurality of mobile terminals is placed in a first radio base station or in a first node when registering the location of the mobile terminal.

22. The computer-readable storage medium claimed in claim 21, wherein the means for storing and managing the communication party list includes a means for creating a list of a fixed number of the most communicated communication parties by monitoring communications on the mobile terminal.

23. A computer-readable storage medium storing instructions for enabling a computer constituting an agent in a network that includes a plurality of subnetworks interconnected with each other and that includes mobile terminals each having a Care-Of (C/O) address depending on a subnetwork to which the mobile terminal is currently connected and a home address which is independent of the subnetwork, to function as a means for receiving a binding update request sent from each mobile terminal when the subnetwork connected to the mobile terminal has changed; and means for notifying respective communication parties in a communication party list attached to the received binding update request about a pair of the latest C/O address and home address of the mobile terminal;

wherein the network comprises a means for deciding whether a foreign agent function of each of a plurality of mobile terminals is placed in a first radio base station or in a first node when registering the location of the mobile terminal.

24. The mobile terminal management system claimed in claim 9, wherein the location of the foreign agent of the mobile terminal is changed based on the availability/use of resources in the packet network of the mobile communication network.

25. The mobile terminal management system claimed in claim 9, wherein the location of the foreign agent of the mobile terminal is changed in response to a delay request of the user application of the mobile terminal.

26. The mobile terminal management system claimed in claim 12, wherein the plurality of subnetworks comprises:

a plurality of base stations, wherein the plurality of base stations are interconnected;

at least one first node, wherein the at least one first node are interconnected; and a second node.

27. The agent in the network claimed in claim 20, wherein the plurality of subnetworks comprises:

a plurality of base stations, wherein the plurality of base stations are interconnected;

at least one first node, wherein the at least one first node are interconnected; and a second node.

28. The computer-readable storage medium claimed in claim 23, wherein the plurality of subnetworks comprises:

a plurality of base stations, wherein the plurality of base stations are interconnected;

at least one first node, wherein the at least one first node are interconnected; and a second node.

29. The mobile terminal management system claimed in claim 1, wherein the first node is a Packet Data Support Node and the second node is a Packet Data Gateway Node.

30. The mobile terminal management system claimed in claim 12, wherein a mobile terminal changes the subnetwork to which it is connected when the mobile terminal moves from:

a home link to a foreign link;

a first foreign link to a second foreign link; or a foreign link to a home link.

31. The mobile terminal management system claimed in claim 18, wherein a mobile terminal changes the subnetwork to which it is connected when the mobile terminal moves from:

a home link to a foreign link;

a first foreign link to a second foreign link; or a foreign link to a home link.

32. The mobile terminal management system claimed in claim 12, wherein the plurality of subnetworks are interconnected to each other though an IP core network; and the network comprises a Gateway GPRS Support Node for providing a home agent function to a mobile terminal.

* * * * *